US006334158B1

United States Patent
Jennyc et al.

(10) Patent No.: US 6,334,158 B1
(45) Date of Patent: *Dec. 25, 2001

(54) USER-INTERACTIVE SYSTEM AND METHOD FOR INTEGRATING APPLICATIONS

(75) Inventors: Kenn S. Jennyc; Andrew F. Ginter, both of Calgary (CA)

(73) Assignee: Agilent Technologies, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/758,404

(22) Filed: Nov. 29, 1996

(51) Int. Cl.[7] .................................................... G06F 9/54
(52) U.S. Cl. .................................... 709/328; 713/1
(58) Field of Search ...................... 395/680, 682, 395/683, 712, 200.01; 709/700, 702, 703, 310–332; 717/1–10; 713/1, 2, 100

(56) References Cited

U.S. PATENT DOCUMENTS

| 5,421,015 | 5/1995 | Khoy et al. ........................ 709/107 |
|---|---|---|
| 5,457,797 | * 10/1995 | Butterworth et al. ............... 709/320 |
| 5,475,819 | * 12/1995 | Miller et al. ....................... 709/203 |
| 5,524,253 | 6/1996 | Pham et al. ........................ 709/202 |
| 5,551,030 | 8/1996 | Linden et al. ...................... 707/102 |
| 5,724,506 | * 3/1998 | Cleron et al. .................. 395/200.01 |
| 5,754,845 | * 5/1998 | White et al. ......................... 707/10 |
| 5,797,015 | * 9/1998 | Daniels, Jr. et al. ............... 395/712 |
| 5,819,090 | * 10/1998 | Volp et al. ......................... 395/682 |

* cited by examiner

Primary Examiner—St. John Courtenay, III

(57) ABSTRACT

An application integrator that provides a user-interactive environment for integrating software applications having incompatible programming interfaces, such as production control and business enterprise systems. The application integrator generally comprises a configuration system that provides a user with a view of the software applications' name space and graphically represents user-determined associations between data units from each of the software applications. The graphical association represents a user-defined programmed interface, identifying which data units of the software applications to transfer and under what circumstances such transfers should occur. This information is stored by the configuration system in a configuration repository. A data server contains two distributed communication objects, each of which interfaces with a corresponding software application, and a mapping engine. The mapping automatically transfer data units between the two software applications in a transaction-oriented manner and in accordance with the user's preferences as specified in the configuration repository.

23 Claims, 20 Drawing Sheets

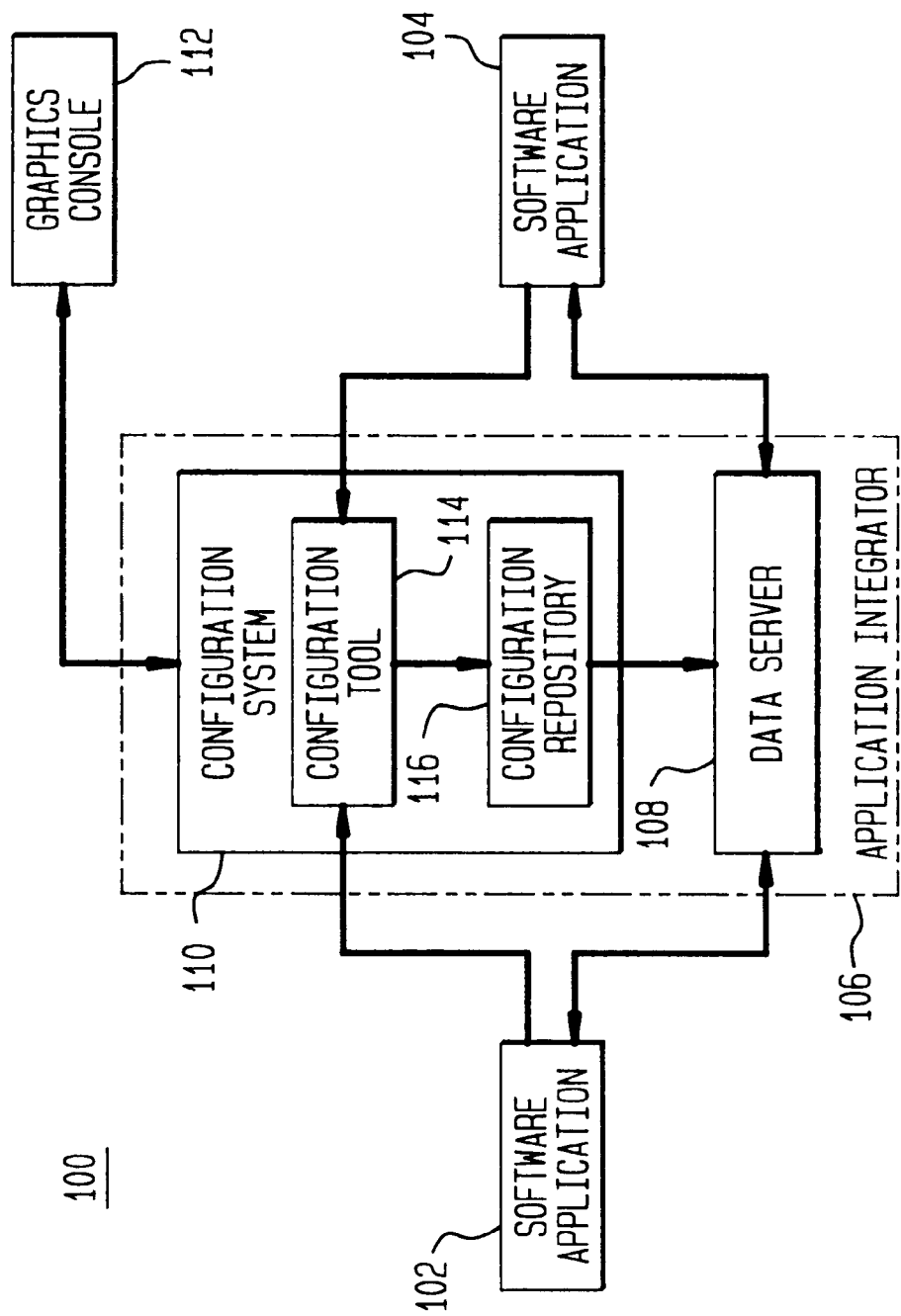

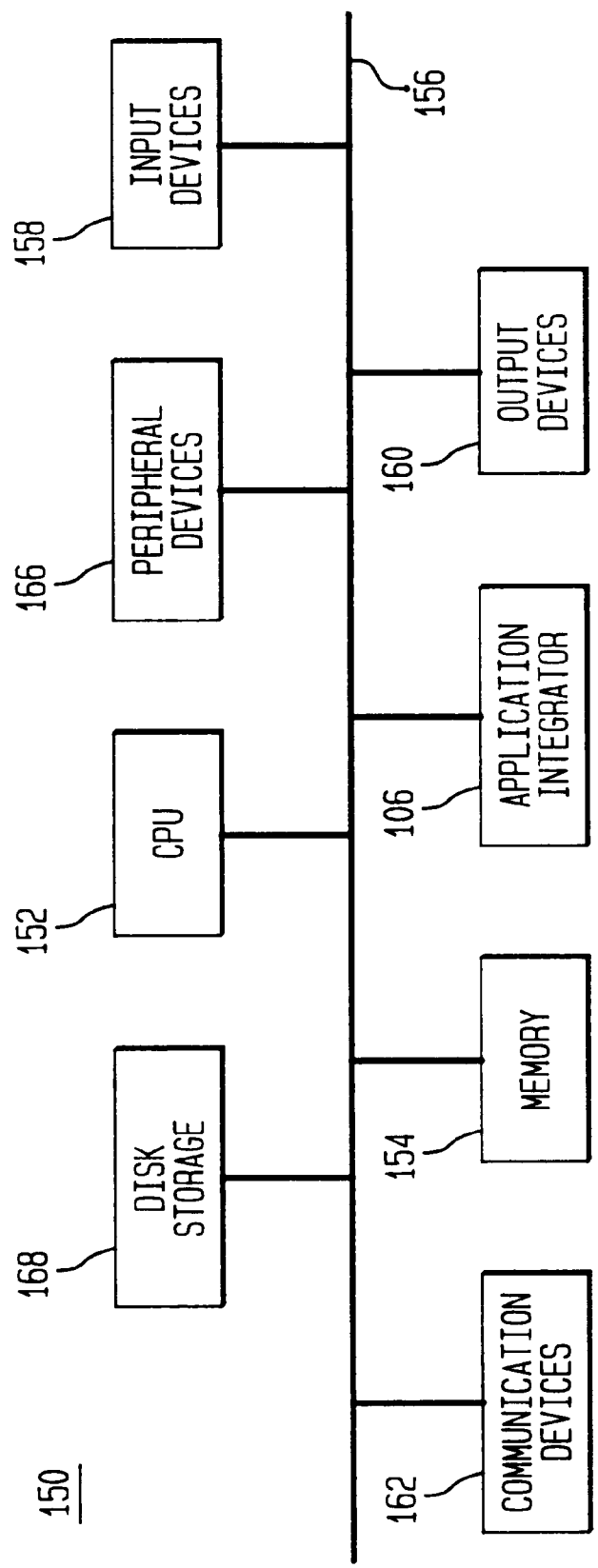

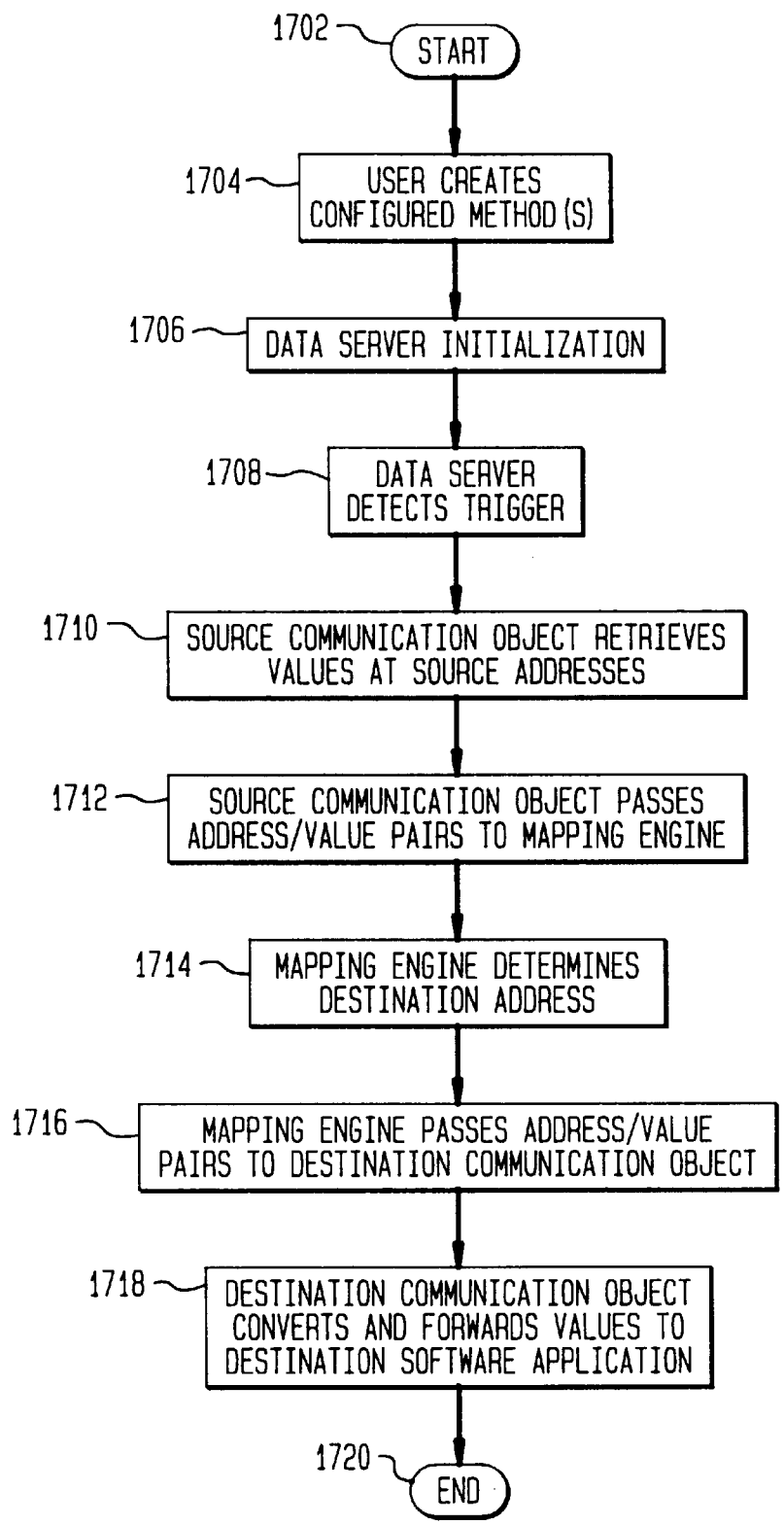

USER-INTERACTIVE SYSTEM AND METHOD FOR INTEGRATING APPLICATIONS

BACKGROUND OF THE INVENTION

1. Field of The Invention

The present invention relates generally to a system for integrating software applications and, more particularly, to a user-interactive applications integration system that integrates software applications having incompatible programming interfaces.

2. Related Art

Historically, computers have had a profound effect upon the manner in which companies conduct business. Initially, computers were only used at the highest levels of large corporations. They were typically used, for example, to run business software to manage business functions such as payroll, scheduling, and inventory. These software systems were generally referred to as business enterprise systems. As the cost of computing decreased, the use of computers expanded to support other areas of the organization. Of primary importance is the evolution of production software to automate factory-floor production.

Although this automation has typically led to improved efficiency and increased productivity, automation of large businesses and factories has often been conducted on a piecemeal basis due to the cost of such automation. For example, different portions of an assembly line are often automated at different times and often with different computer equipment. This is a result of the varying capabilities of the computer systems available at the time of purchase. As a result, when computers first appeared on the factory floor, they were generally isolated systems dedicated to automating selected steps in production. Accordingly, these isolated systems are often referred to as "islands of automation." In such organizations, different functions in the overall process are automated but do not necessarily communicate with one another. As a result, it has been difficult and expensive to control an entire factory floor process for a large manufacturing facility from a central location except on a piecemeal basis.

While business software was generally solving large company-wide problems, production software attempted to solve smaller, more isolated problems. Furthermore, while business software was more transaction- and batch-oriented, production software was more real-time in nature. These differing needs caused the two fields of computing to diverge. In addition, a third field of computing evolved with the introduction of low-cost microprocessors. Specialized factory-floor microcontrollers implementing such microprocessors have been used to automate even more factory-floor tasks than production software and include, for example, programmable logic controllers (PLC's) and other "smart" plant-floor devices. Thus, there are generally three fields of computer technology supporting activities at a different functional layer of an organization. Enterprise business systems support business management functions; production systems support factory floor operations; and microcontrollers support specialized factory floor functions.

Over the last decade the market-place has become increasingly dynamic. Businesses have had to adapt more quickly to changing market conditions. This has forced business enterprise systems to suffer constant modification and adopt more real-time behaviors, and has simultaneously forced production computers to become more flexible. This in turn has increased the frequency and volume of data that is transferred between the business and production systems, and between each of the many production systems. Thus, while industry's historical focus has been on the optimization of computer technology to address the special needs of each field of computer technology, the current trend is to make computers at all functional layers of an organization intercommunicate via electronic data transfers.

There has always been a requirement to transfer data between computers in an organization, both horizontally between computers in the same functional level of the organization, and vertically between computers in adjacent organizational levels. In the past, manual data re-entry was an often-used approach. Hardcopy printouts generated by the business enterprise systems would be provided to an operator who manually entered the information into one or more production systems. Although this may have been an acceptable approach in the past, such an approach is not sufficiently responsive in today's dynamic business environment. As a result, the demand for electronic data transfer capability between the various business management and production level computers has increased significantly.

Computer products have always provided minimal support of electronic data transfers between software applications residing in the same functional level of an organization. On the business management level, for example, integrated business enterprise software products are commonly used to effect electronic data transfer between the software applications in the integrated package. Organizations that have not acquired a single, integrated business software package typically have developed custom software to effect the necessary electronic data transfer. While electronic data transfer capability can be implemented using custom software, the market place dynamics that have caused the enterprise business and production systems to suffer constant modification also force electronic data transfer software to be constantly reworked. This continued modification forces companies to either maintain in-house programming expertise, or repeatedly hire software consultants to implement the needed changes. As a result, custom software is not only expensive to develop, but in a changing market place, it is also costly to maintain.

With respect to the factory floor, software programmers have also been employed to develop custom data transfer solutions which allow the different "islands of automation" to communicate with each other. For the reasons noted above, this has been found to be difficult and expensive. In addition, such an approach is rather inflexible and assumes that the overall system remains static. When further equipment and application software is to be integrated into the overall system, the software programmers must be tasked with rewriting the code for all applications involved and to prepare additional custom code for interface purposes. As a result, electronic data transfer capability is usually limited to transfers between equipment/software from the same manufacturer.

For electronic data transfers between adjacent organizational levels there are numerous problems in such integration of existing applications because of the differences in hardware and their associated operating systems and because of the differences in the software applications themselves. For example, data from applications running on computers having proprietary hardware architectures and operating systems is often not usable on another system. In addition, different applications use different data types according to their specific needs. Moreover, incompatible data structures often result because of the different groupings of data elements by the applications. For example, an element with a common logical definition in two applications may still be stored in two different representations. In addition, applications written in different languages usually cannot communicate with one another since data values are often interpreted differently. For example, C and Fortran interpret logical and boolean values differently.

What is needed, therefore, is a system for automatically integrating applications having incompatible programming interfaces at the same or different functional levels of an organization in a fast, efficient and cost effective manner.

SUMMARY OF THE INVENTION

The present invention relates to an application integrator that provides a user-interactive environment for integrating software applications having incompatible programming interfaces, such as production control and business enterprise systems. The application integrator generally comprises a configuration system that provides a user with a view of the software applications' name space and graphically represents user-determined associations between data units from each of the software applications. The graphical association represents a user-defined programmed interface, identifying which data units of the software applications to transfer and under what circumstances such transfers should occur. This information is stored by the configuration system in a configuration repository. A data server contains two distributed communication objects, each of which interfaces with a corresponding software application, and a mapping engine that automatically transfers data units between the two software applications in a transaction-oriented manner and in accordance with the user's preferences as specified in the configuration repository. Significantly, the mapping engine transfers a data unit from a source to destination address by transferring a single address/value pair from the source to destination communication object. During the transfer, the mapping engine converts the address from the source address to the destination address while transforming the value as needed for the destination application.

Significantly, the application integrator provides the user with the ability to define where a single unit of data comes from in a source application and where it is written to in a destination application. The association of the source and destination addresses is referred to herein as a "mapping." While each mapping defines the transfer of a single data unit, to enable software applications to simultaneously transfer many such data units, the application integrator organizes related mappings into groups referred to as "configured methods." A configured method not only contains mappings but also configuration information, referred to "trigger criteria", that defines when to transfer the data units in accordance with the mappings associated with the configured method. Thus, a configured method includes one or more mappings that specify which data unit(s) to transfer and where to transfer them, and one or more trigger criterion that specify when to transfer the data unit(s). Just as mappings are grouped into configured methods, configured methods are organized into larger entities referred to herein as "configuration objects." The configuration system enables a user to create multiple configuration objects and to select which one is to be implemented in the data server at a given time.

Specifically, the configuration system includes a configuration tool that stores user-specified mappings and triggers in the configuration repository of the configuration system. These files are subsequently read by the data server to implement the mappings and triggers. The configuration tool includes a core component that implements the configuration tool's generic, system-independent functionality. The configuration tool also includes two communication objects, each configured to obtain name-space data that is unique to its associated software application, and to establish application-specific communication requirements and trigger criteria. A utility component provides well-known routines for manipulating data and for supporting the creation of user-interactive windows on a graphics console.

Each configuration tool communication object contains objects that perform functions related to obtaining an associated software application's name space and for maintaining data mappings to and from the software application. This enables the core component to display the entire name-space of both of the software applications, enabling the user to associate the addresses in each of the software applications that contain the data unit. Advantageously, this approach relieves the user from having to remember the names of the source and destination addresses.

The communication object also specifies any system-specific access parameters that may be needed to communicate with the associated software application. Such parameters include, for example, host computer names, login names and passwords. Also, system-specific trigger criteria that may be necessary for a particular configured method to be implemented by the data server are also determined by the communication objects. Thus, the trigger criteria stored with an associated configured method and implemented by the data server may specify generic as well as system-specific trigger criteria. Significantly, the configuration tool can be customized to support new software applications simply by developing new communication objects.

The data server contains two distributed communication objects to connect the application integrator to the software applications, and a mapping engine that accesses the configuration repository to perform a configured method's data unit mappings upon the occurrence of the associated trigger condition. More specifically, the data server's communication objects implement application-specific dependencies received from the configuration tool's communication objects, including the generation of application-specific triggers and transfer of data with the associated software application. The data server communication objects are preferably distributed between the application integrator and the associated software application platform, and communicate with their corresponding software application through any mechanism specific to the software application such as a UNIX socket or application program interface (API). Alternatively, the communication object and the data server reside on the same platform as the associated software application.

The mapping engine reads the configuration repository, responds to triggers, and maps source to destination addresses, while transforming the data units being mapped. Significantly, to transfer a data unit, only an address/value pair is transferred between the mapping engine and communication objects. That is, the value of the address/value pair is encoded in a neutral form, standardizing the interface between the mapping engine and the communication objects. Advantageously, this requires that the communication objects only retain information regarding their own name-space, and how to convert between the data format of the associated software application and the neutral format.

The communication object-mapping engine interface is also designed to support transaction-oriented data transfers via commit and rollback. When mapping attempts fail, it allows the end-user to undo, or rollback, all data transfers done by all previous mappings associated with the method and current trigger event.

In operation, the user creates one or more configured methods, each containing one or more mappings and specified trigger criteria. This information is saved into one or more configuration files in the configuration repository. The user then starts the data server. The data server reads the above configuration files, and requests that the appropriate communication object detect the occurrence of the specified trigger criteria, and then enters an event-driven mode, waiting for the configured method's trigger criteria to be satisfied.

When one of the data server's communication objects detects that a method's trigger criteria has been satisfied, it informs the data server mapping engine that the associated configured method has been triggered. Alternatively, the data server mapping engine detects that a configured method's time-based trigger criteria has been satisfied.

Upon the occurrence of the trigger condition, the data server mapping engine requests, from the source communication object, the current data values of the configured method's specified source addresses. The communication object obtains these values from the software application, translates the format of all retrieved data values to a neutral format, and then passes the result to the mapping engine as address-value pairs (one such pair for each of the method's mappings). The data server mapping engine looks up the destination address for each source address to compose a new list of address-value pairs, with the address now being the destination address and the value still expressed in the same neutral format. The data server mapping engine sends the new list of address-value pairs to the destination communication object. The destination communication object converts the values to the format expected by the destination software application, and then writes the result to the specified destination addresses in the destination software application.

Advantageously, the application integrator is a user-interactive system that interconnects software applications that were not originally designed to communicate with each other, such as business enterprise and production control systems, without custom programming, thereby greatly reducing the cost and effort required to integrate such applications.

Another advantage of the present invention is its capability to provide a user with a view into the name space of the software applications and the ability to allow the user to easily and quickly associate source and destination addresses for a particular data unit. Significantly, the resulting user-defined mappings are displayed as a graphical association between source and destination addresses to provide the user with a visualization of the programmed interface between the software applications.

A still further advantage of the present invention is that the application integrator provides the user with the capability of grouping the mappings into configured methods and defining the criteria under which each configured method's mappings will be transferred from a source to destination software application. This user-defined association between user-defined mapping and user-defined trigger criteria provide the user with the ability to efficiently define the programmed interface between the software applications.

A further advantage of the present invention is that the transfer of data units between the source and destination software applications is effected through the transfer of name/value pairs. This exchange of name/value pairs occurs across a standardized interface within the application integrator between user-defined software application interfaces. This requires the communication objects to convert the data only between the data format of the associated software application and the neutral format. This enables the user to develop a communication object without knowledge of any other existing or future communication object with which the present communication object will ultimately exchange information. In addition, the mapping engine does not have to query each communication object for a description of the information to be exchanged before the transfer takes place since the information supplied by each communication object is self-describing in a standardized, neutral format.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF THE DRAWINGS

This invention is pointed out with particularity in the appended claims. The above and further advantages of this invention may be better understood by referring to the following description when taken in conjunction with the accompanying drawings, in which:

FIG. 1A is a block diagram of a multi-system environment implementing one preferred embodiment of the application integrator of the present invention;

FIG. 1B is a block diagram of an exemplary computer platform in which the application integrator of the present invention may be implemented;

FIGS. 16A–16D are a flow chart of the data sever control flow; and

FIGS. 17A–17B are a flow chart of the operation of the application integrator.

DETAILED DESCRIPTION

I. System Overview

Figure 2A:
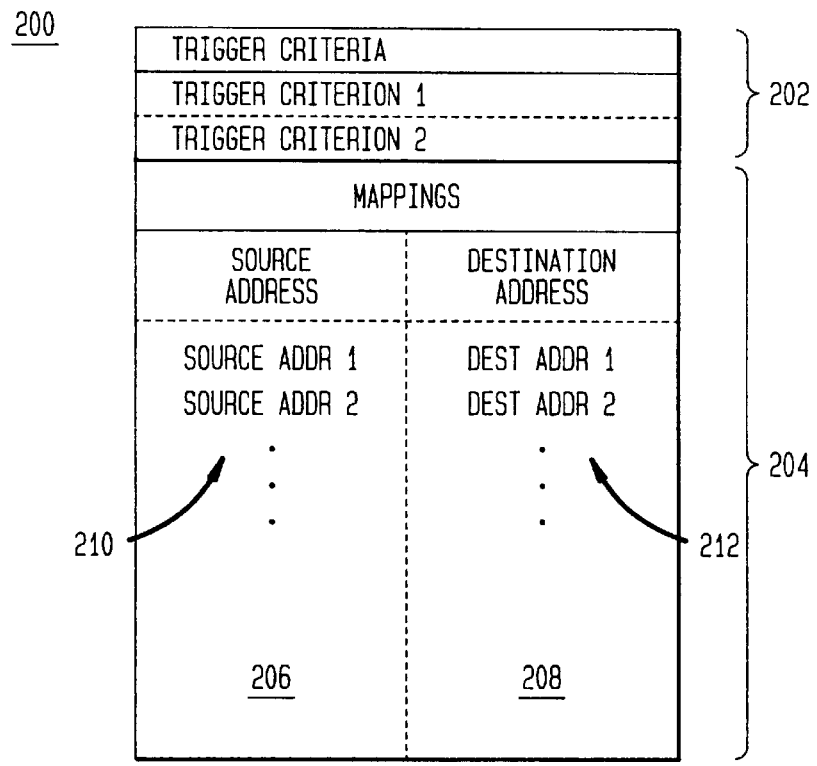
FIG. 2A is a block diagram of one embodiment of a configured method which is created by a user using the configuration system and stored in the configuration repository illustrated in FIG. 1A.

FIG. 1A is a block diagram of a multi-system environment 100 implementing one embodiment of the application integrator 106 of the present invention. The application integrator 106 generally includes a configuration system 110 and a data server 108 to provide a user-interactive environment for integrating software applications 102 and 104 which may be otherwise unable to communicate due to incompatible programming interfaces. These software applications 102 and 104 may be, for example, a production control software system and an enterprise business software system.

The configuration system 110 includes a configuration tool 114 that graphically associates user-selected data units of the software applications 102 and 104, enabling a user to define which data units of the software applications to transfer and under what circumstances such transfers should occur. This information is stored by the configuration system 110 in a configuration repository 116. The data server 108 is preferably non-interactive software-based system that accesses the configuration repository 116 to transfer automatically data units between the two software applications 102 and 104 in accordance with the user's preferences.

The application integrator 106 is preferably configured as a generic, object oriented, electronic data transfer software application that resides on any well-known computing platform. A typical computer platform 150 that may support the application integrator 106 is shown in FIG. 1B. The computer system 150 includes a processor 152 connected to a memory system 154 through an interconnection mechanism 156, which is typically one or more buses. Input devices 158 may include, for example, a keyboard, keypad, trackball, mouse, pen and tablet, video input, digital camera, or image scanner. Output devices 160 include graphics console 112, which may be cathode ray tube (CRT) display, liquid crystal display (LCD) or other type of display system. The input and output devices may be included within or external to a main unit which typically houses the processor 152, memory system 154 and interconnection mechanism 156. Communication devices 162 may be connected to the interconnection mechanism 156 and may include network interfaces such as a modem, ATM or Ethernet interface card.

The computer system 150 may be a general purpose computer system, which is programmable using a high level computer programming language. The computer system may also be implemented using specially programmed, special purpose hardware. In the general purpose computer system 150, the processor 152 is typically a commercially available processor, such as the Pentium microprocessor from Intel Corporation, PowerPC microprocessor, SPARC processor, PA-RISC processor or 68000 series microprocessor. Many other processors are also available. Such a processor usually executes a program called an operating system, such as the various versions of the Windows and DOS operating systems from Microsoft Corporation, or the Unix operating system available from many vendors such as Sun Microsystems, Inc., Hewlett-Packard and AT&T, which controls the execution of other computer programs and provides scheduling, debugging, input-output control, accounting compilation, storage assignment, data management, memory management, and communication control and related services. The processor 152 and operating system define a computer platform for which application programs in high level programming languages are written.

The illustrative embodiment of the present invention includes implementing code written in the Tcl (Tool Command Language) programming language, as discussed below. It should be understood that the invention is not limited to a particular computer platform, particular operating system, particular processor, or particular high level programming language. Those skilled in the art will appreciate that different implementations, including different function names, programming languages (such as C or C++), data structures, and/or algorithms may also be used in other embodiments of the present invention.

The software routines for performing software application integration in accordance with the invention typically reside in memory 154 and/or disk storage unit 168, and may be stored on a computer-readable medium such as, for example, magnetic disk, compact disk or magnetic tape and may be loaded into the computer system 150 using an appropriate peripheral device 166, as known in the art. It will be understood that the hardware components identified above are given by way of example only and that the invention may be implemented in a variety of different computer systems.

Additionally, the application integrator 106 preferably resides on a different computing platform as the software applications 102 and 104. In addition, the software applications 102 and 104 may reside on the same or different computing platforms, or may reside on the same or different nodes of a local area network or wide are network (LAN or WAN) and may communicate via telecommunications or dedicated lines. In alternative embodiments, the application integrator 106 resides on the same computing platform as either or both software applications 102, 104.

The application integrator 106 provides the user with the ability to define where a single unit of data comes from in a source application and where it is written to in a destination application. The association of the source and destination addresses is referred to herein as a "mapping." The data unit, or dtatum, at the specified source address is said to be mapped to the specified destination address (that is, it is read from the source address and written to the destination address).

While each mapping defines the transfer of a single data unit, to enable software applications 102 and 104 to simultaneously transfer many is such data units, the application integrator 106 organizes related mappings into groups referred to as "configured methods." FIG. 2A is a block diagram of one embodiment of a configured method 200 created by a user using the configuration system 110 and stored in the configuration repository 116 illustrated in FIG. 1A.

The configured method 200 includes mappings 204 between source application addresses 210 and destination application addresses 212 stored in source application address column 206 and destination application address column 208, respectively. As will be described below, the configuration tool 114 displays a configured method's mappings 204. Preferably, the configuration tool 114 actually displays, and the data server 108 actually transfers, mapped data in the same order as it appears in the illustrated table, with the mapping shown on the first row being the first transferred. This ensures that the mappings are explicit and intuitive to the user. It is noted, however, that other display formats and transmission sequences are considered to be within the scope of the present invention.

The configured method 200 not only contains mappings 204 but also configuration information that defines when to transfer the data units in accordance with the mappings associated with the method. This configuration information is referred to herein as a configured method's "trigger criteria" 202. Thus, a configured method 200 includes one or more mappings 204 that specify which data unit(s) to transfer and from (206) and to (208) where to transfer them, and one or more trigger criterion 202 is that specify when to transfer the data unit(s). The configuration tool 114 displays the possible trigger criteria to the user in an interactive trigger control window described below that provides the user with the ability to specify the criteria 202 upon which the configured method's mappings are implemented. The trigger criteria 202 is part of the definition of a configured method 200. Thus, all of a method's mappings 204 share the same trigger criteria 202. Whenever the trigger criteria 202 is satisfied, the data server 108 transfers the data specified by the mapping source addresses to the destination addresses in unison.

The application integrator 106 is configured to allow the user to define multiple configured methods simultaneously. Thus, in the illustrative embodiment wherein the software applications are production and control and business enterprise systems. a user may create a configured method 200 to transfer a particular production recipe from the enterprise business system to the plant floor control system, and a second method to periodically transfer from the production to business system status information such as raw-material consumption data.

Figure 2B:
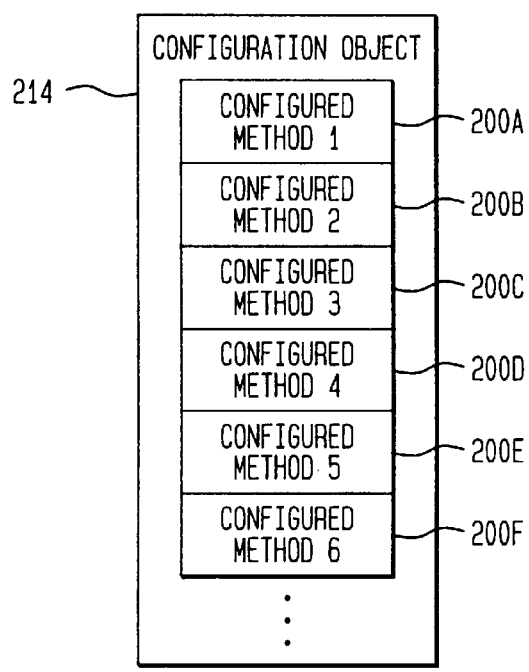
FIG. 2B is a block diagram of a configuration object containing a plurality of configured methods illustrated in FIG. 2A.

Referring to FIG. 2B, configured methods 200 may be organized into larger entities referred to herein as "configuration objects." In the illustrative embodiment, configuration object 214 contains configured methods 1–6. The configuration system 110 enables a user to create multiple configuration objects 214 and to select which will be implemented by the data server 108 at any given time.

Figure 2C:
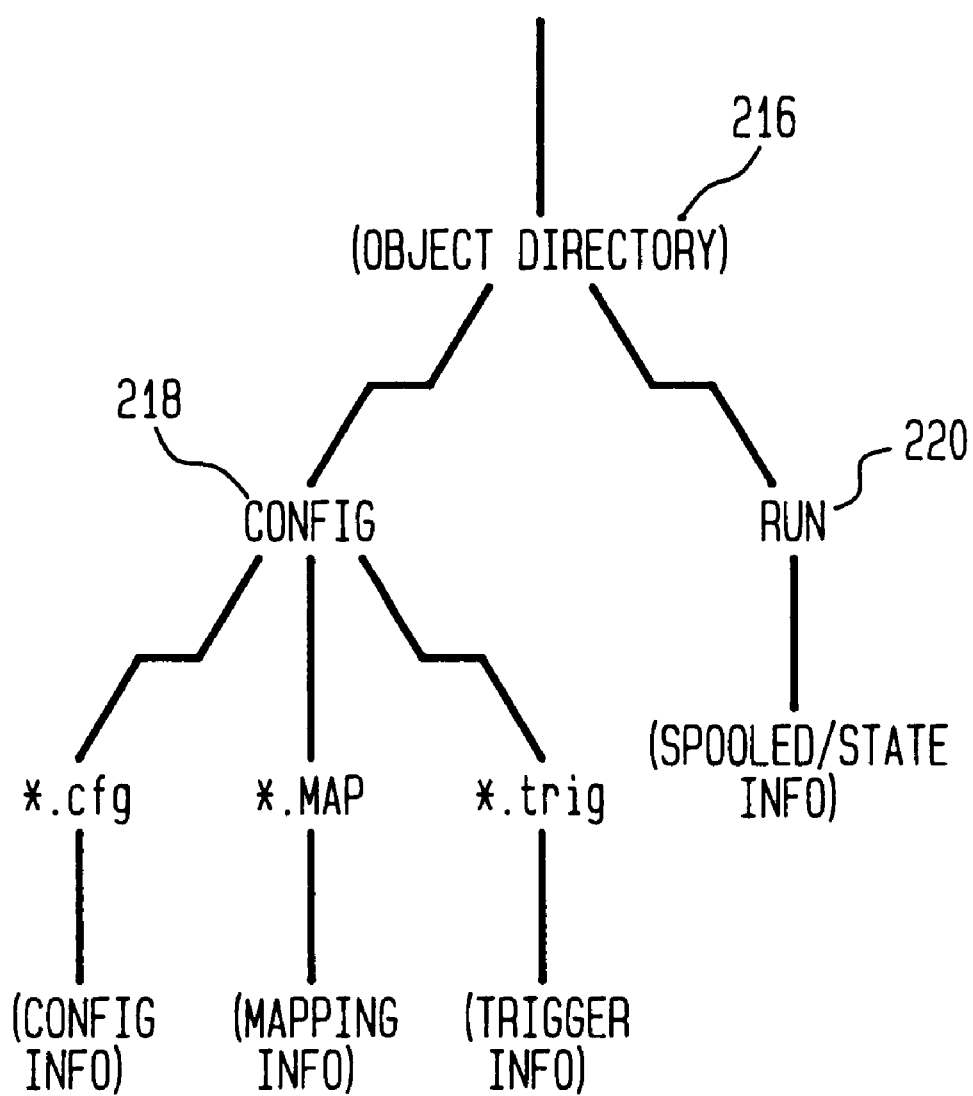
FIG. 2C is an illustration of the hierarchal UNIX file system format in which configuration and other data is stored in the configuration repository 116 illustrated in FIG. 1A.

Referring to FIG. 2C, the configuration object 214 is stored in the configuration repository 116, preferably in the form of files and directories. The base directory 216 for a configuration object 214 is preferably named after the configuration object 214. The run directory 220 stores spooled data and state information needed by the data server 108 at run time. The configuration directory 218 contains the configuration object's 214 configuration files. The data in each configuration file is stored in the form of a Tcl script, enabling the configuration tool 114 and data server 108 to easily load the configuration data when needed. Preferably, the subdirectories of the configuration director 218 are labeled in accordance with the type of information stored in the directory. Other well known means for storing the configuration objects 214 are considered to be within the scope of the present invention.

II. Configuration Tool

Figure 3:
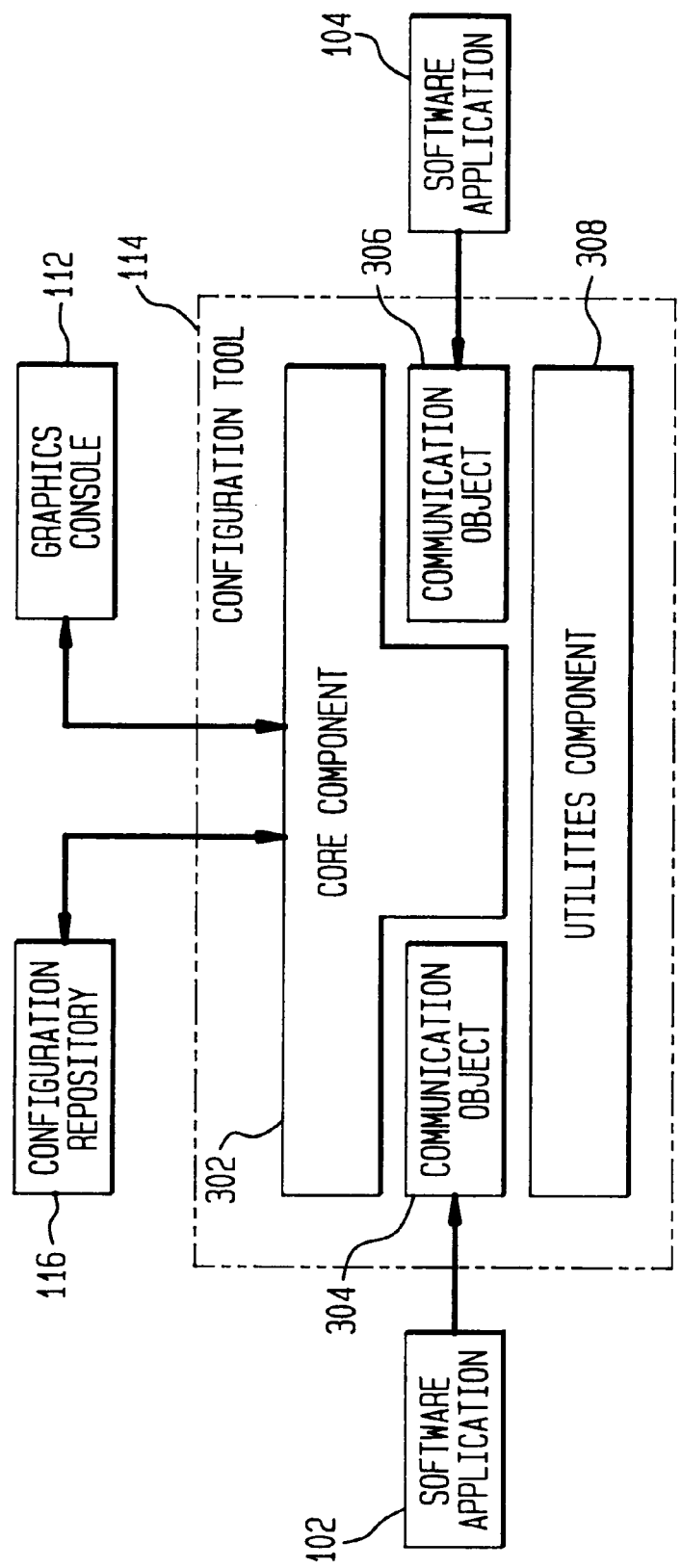
FIG. 3 is a block diagram of the high level architecture of the configuration tool illustrated in FIG. 1A.

FIG. 3 is a high-level architectural block diagram of the configuration tool 114. The configuration tool 114 essentially includes three types of functional elements: A core component 302 that implements all of the configuration tool's generic, software application-independent functionality. Two communication objects 304 and 306 are each configured specifically for a respective software application 102 and 104, respectively. In accordance with the present invention, the configuration tool communication objects 304 and 306 are configured to obtain name-space data from their respective software applications 102, 104. A utility component 308 provides well-known routines for manipulating data and creating windows on graphics console 112.

Figure 4:
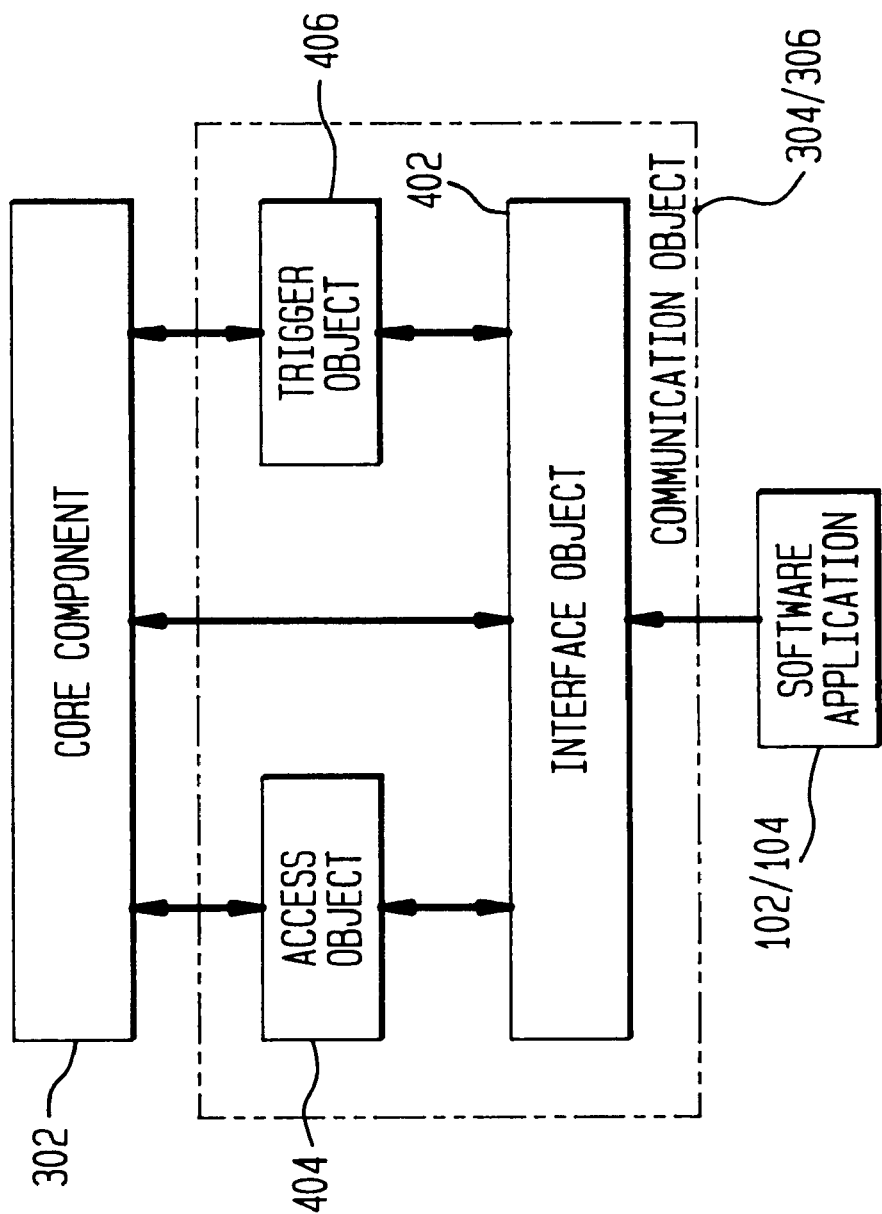
FIG. 4 is a block diagram of the communication objects of the configuration tool illustrated in FIG. 3.

FIG. 4 is a block diagram of the communication objects 304 and 306 of the configuration tool 114. Each of the communication objects 304 and 306 includes an interface object 402 that provides the core component 302 with the associated software application's name space. The core component 302 simultaneously displays, preferably as a tree diagram, the entire name-space of both software applications. Such a graphical representation enables the user to specify which data unit in the source software application to move and to what location in the destination application. The user does not have to remember the names of data units or the source and destination addresses. Instead the present invention enables the user to simply select from the displayed list of possibilities.

An access object 404 specifies any system-specific access parameters that may be needed to communicate with the associated software application 102, 104. Such parameters include, for example, host computer names, login names, and passwords.

A trigger object 406 specifies any system-specific trigger criteria that may be necessary for a particular configured method 214 to be implemented by the data server 108. Significantly, the configuration tool 114 can be customized to support a new software application simply by developing new communication objects.

Figure 5:
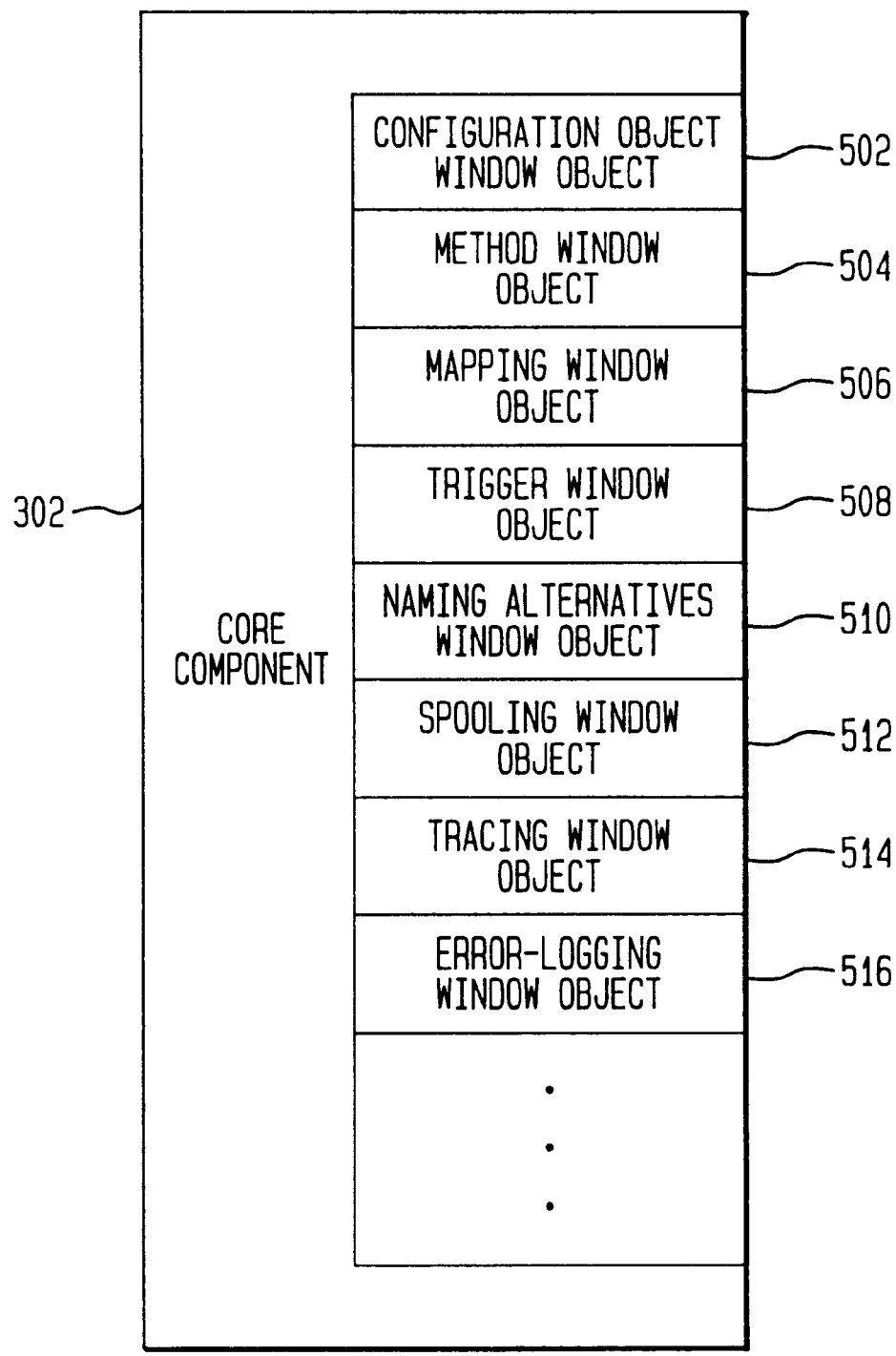
FIG. 5 is a block diagram illustrating the objects contained within the configuration tool core component illustrated in FIG. 3.

FIG. 5 is a block diagram of the core component 302 of the configuration tool 114 illustrated in FIG. 3. The core component 302 contains a number of objects that interoperate with well-known processes provided by the utilities component 308 to display window panels on the graphics console 112. As noted, the configuration tool 114 provides the user with a view of the name space of the software applications 102 and 104 and graphically associates data units selected by the user from the respective name spaces. The graphical association represents a user-defined programmed interface, identifying which data units of the software applications 102, 104 to transfer and under what circumstances such transfers should occur.

The core component 302 interoperates with the interface object 402 to obtain the software applications' name space. The core component 302 also interoperates with the access object 404 to obtain application-specific communication information. and the trigger object 406 to obtain application-specific trigger information. The functionality of each of the core component objects is described below with reference to the display windows or panels that they control.

Figure 6:
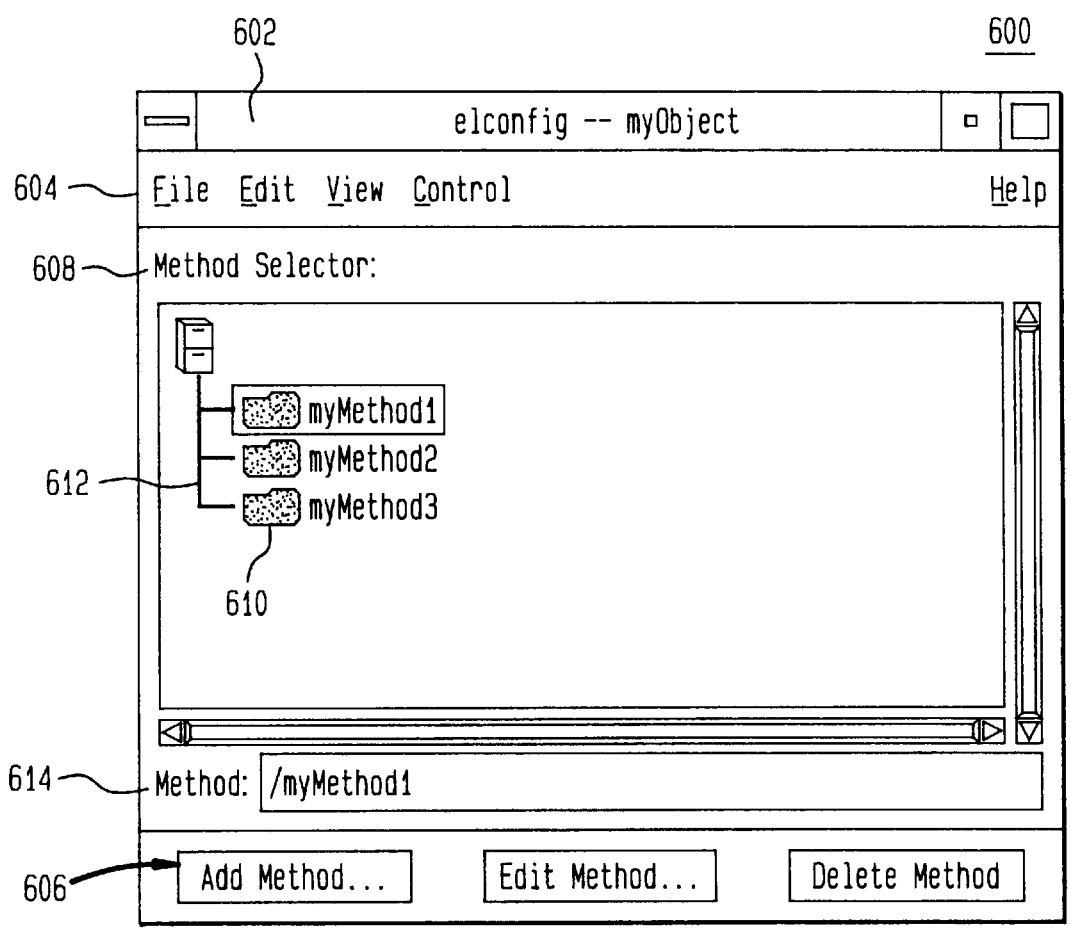
FIG. 6 is an illustration of the main window provided by the configuration system illustrated in FIG. 1A.

The core component 302 includes a configuration object window object 502 for displaying user-defined configured methods for a selected configuration object 214 on the graphics console 112. FIG. 6 is an illustration of an exemplary embodiment of a configuration object window 600 of the present invention. The configuration object window 600 is used by the user to define new configured methods, select existing configured methods for modification, and delete configured methods associated with a particular configuration object 214. The user may invoke these functions by selecting an associated activity control button 606 on the configuration object window 600, some of which invoke other objects of the core component 302 and their associated windows, which are described in detail below. The configuration object window 600 appears upon invocation by the user and when the configuration tool 114 is initially started. The name of the configuration object 214 currently available to the user for editing through window 600 is displayed in a title bar region 602 of the window.

The configuration object window 600 includes a method selector region 608 that displays the configured methods 200 of the displayed configuration object 214. The name space information is preferably displayed in an manner that provides the user with the ability to quickly and easily select a desired source and destination address from the respective name space, allowing the user to add new mappings to, or modify existing mappings of, a selected configured method 200. As shown in FIG. 6, the configured methods 200 are preferably displayed in a hierarchial tree structure 612, with each configured method 200 represented as a node 610 in the hierarchial diagram 612. A user can select an existing configured method 200 from the tree diagram using any commonly available user-input device, such as a mouse or keyboard. The desired configured method becomes selected and the full method name appears in the method text entry box 614. Alternative methods for selecting a configured method may be provided. For example, the user can type the name of the method directly into the text entry box 614. If the entered method exists, it becomes selected on the method selector region 608 tree diagram. Name searches are also supported.

When a configuration object 214 is displayed for editing in window 600, the configuration tool 114 creates a lock file for the configuration object in the configuration object's configuration directory 218. When the object 214 is closed, either by opening another configuration object or by closing the configuration tool 114, the object's lock file is deleted. An attempt to open a communication object 214 that is already open and therefore has a lock file results in the display of a warning message.

Once a configured method 200 has been selected, a user can view or modify the configured method's configuration data as described in detail below. When deleting a configured method, the configuration object window object 502 deletes the mappings and trigger configuration information associated with the selected configured method from the configuration repository. If the selected configured method 200 has children in the hierarchial diagram illustrated in the method selector region 604, deleting the parent configured method 214 also deletes the children methods.

A function bar 604 provides the user with access to well-known and commonly used display functions. For example, to select a configuration object 214, an "Open . . . " menu item is provided in the in the configuration object window's File menu portion of the function bar 614. Selection of this menu item provides a window displaying all presently available configuration objects 214 from which the user may open a desired configuration object for editing. Selection of the configuration object 214 causes the configuration window object 502 to display the configured methods 200 contained within the selected configuration object 214 in the method selector region 604.

Through the function bar 604 the user may perform other functions such as specify error logging functions including, for example where the data server 108 logs errors, configure tracing functions, including where the data server 108 writes trace information, whether error messages are included in the trace output, etc.

Figure 7:
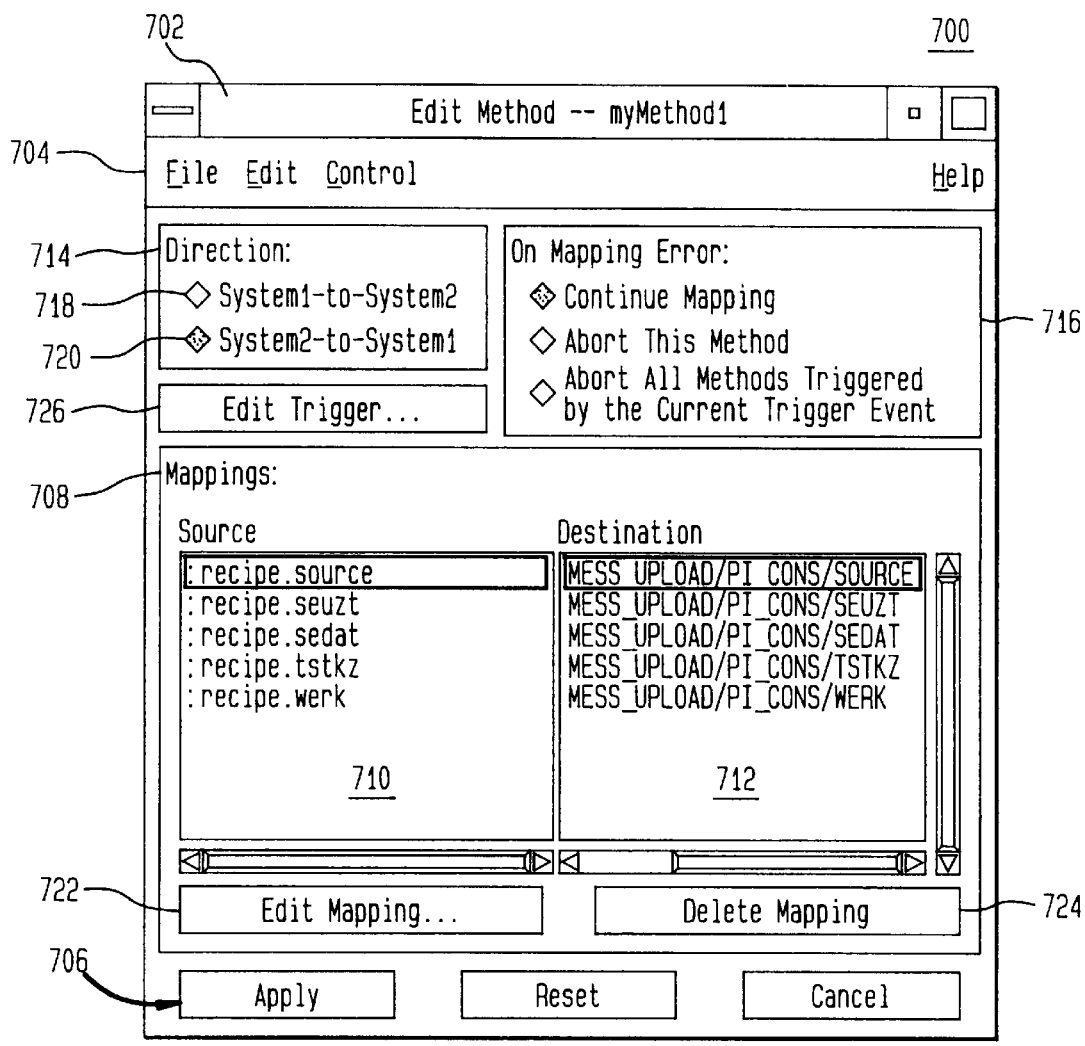
FIG. 7 is an illustration of the method window provided by the configuration system illustrated in FIG. 1A.

The core component 302 also includes a method window object 504 for displaying an edit method window 700 for a configured method 200 selected from the configuration object window 600. FIG. 7 is an illustration of an exemplary embodiment of an edit method window 700. In accordance with the present invention, the edit method window 700 includes a mappings region 708 that displays the mappings associated with a configured method 200, identified in the title bar region 702 of the window 700.

Preferably, the mappings region 708 displays the mappings as a multi-column list of source-destination address pairs. The edit method window 700 mappings region 708 displays mappings as a two-column list, with source address column 710 adjacent to a destination address column 712. Row-aligned source and destination addresses represent a source-destination pair.

The edit method window 700 allows the user to edit a selected configured method's mappings and triggers. The method window object 504 obtains the mappings and triggers from the configuration directory 218 in the configuration repository 116. The method window object 504 displays the window 700 when the user attempts to edit or add a configured method through the main window 600. The name of the selected method currently being edited is provided in the edit method window's title bar region 702.

To edit a mapping, the user selects the edit mapping button 722, causing an edit mapping window to appear. This is discussed in detail below with reference to FIG. 8. Likewise, to edit a trigger, the user selects the edit trigger button 726, causing an edit trigger window to appear to enable the user to specify when to transfer the data units in accordance with the displayed mapping. This is discussed in detail below with reference to FIG. 9.

A direction control region 714 having two direction radio buttons 718 and 720 enable the user to specify the direction to transfer data units for the selected configured method 214. All mappings in the displayed configured method 214 transfer data in the same direction.

A mapping error control region 716 contains radio buttons enabling the user to specify what functions are performed by the data server 108 when errors occur during the transfer of the data units in a configured method 200. In the illustrative embodiment shown in FIG. 7, three choices are presented to the user. The user may elect to continue performing the mappings in the current configured method 214 as though the error had not occurred. In this case, the data server 108 reports and logs an error for the failed mapping. Alternatively, the user may elect to abort this configured method, allowing all unprocessed mappings defined by the current configured method 214 to be skipped, but all configured methods triggered by the current trigger event to continue as though the error had not occurred. In this case, the data server 108 reports and logs an error for the failed mapping. A third alternative is that the user may elect to abort all configured methods 200 triggered by the current trigger, allowing both unprocessed mappings defined by the current configured method 214 and all configured methods 214 triggered by the current trigger event to be skipped. The data server 108 reports and logs an error for the failed mapping as in the other alternatives. Other approaches to responding to error conditions are considered to be within the scope of the present invention. Additional error logging and tracing functions may be provided. For example, an error-logging window object 516 may be provided that enables the user to specify, through an associated window, where the data server 108 is to route the error information when an error occurs. A tracing window object 514 may be provided that enables the user to specify, through an associated window, where the data server 108 is to route trace information.

Activity control buttons 706 are provided to enable the user to apply, reset or cancel the entries that were made to the window 700.

It is understood that mapping may be developed external to the present invention and imported and added to the mappings region 708. In one embodiment, the imported files are formatted as an ASCII file. Other file formats are also within the scope of the present invention.

Figure 8:
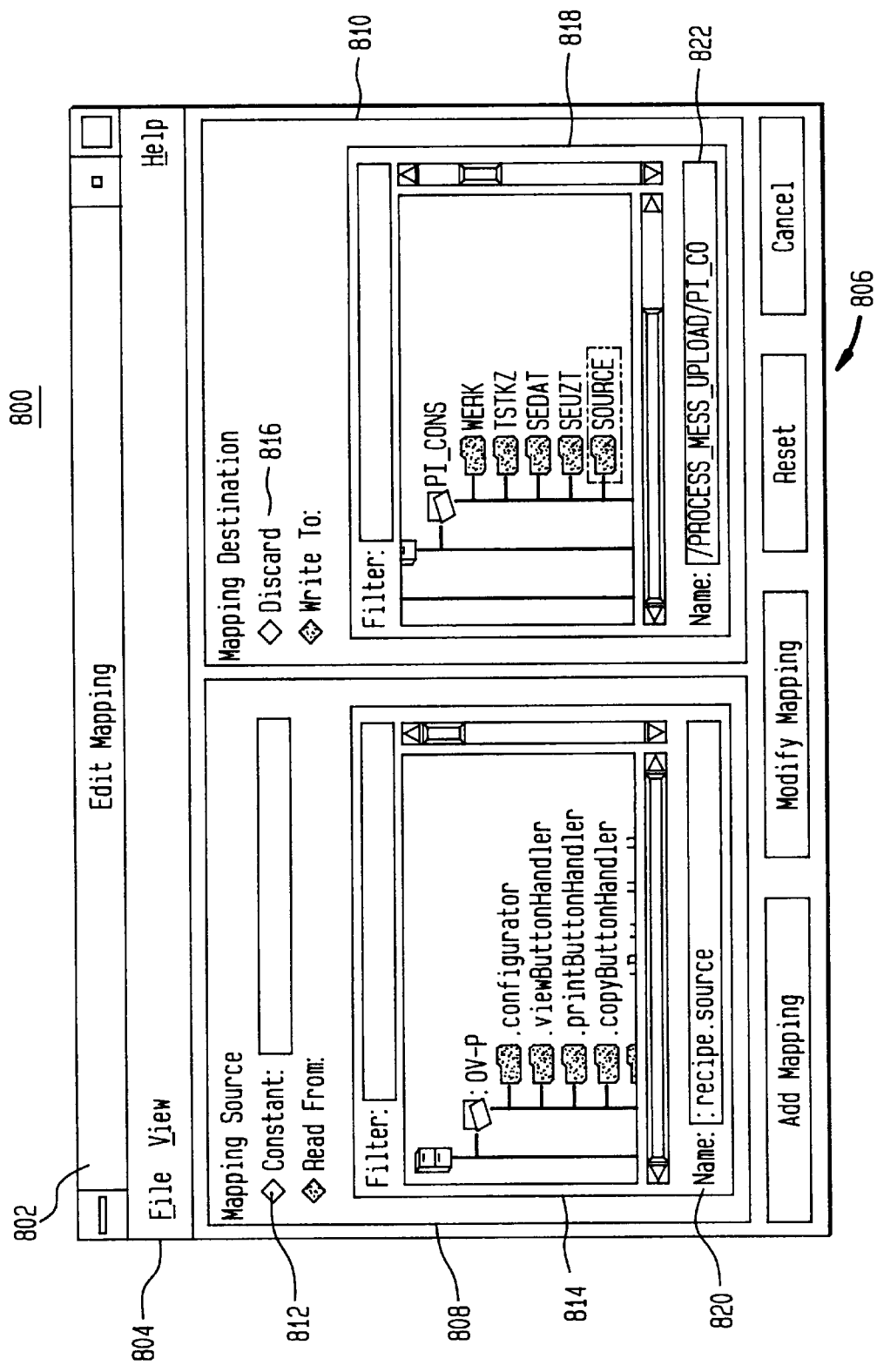
FIG. 8 is an illustration of the mapping window provided by the configuration system illustrated in FIG. 1A.

The core component 302 also includes a mapping window object 506 for displaying an edit mappings window for a selected mapping from the edit method window 700. FIG. 8 is an illustration of an exemplary embodiment of an edit mapping window 800. In accordance with the present invention, the mapping window object 506 receives the name-space information from each of the communication objects 304 and 306 and displays the name space information in the window 800. The window 800 appears when the user selects the edit mapping button 722 on the method window 700 or in any other well-known manner, such as through a menu option on function bar 704.

The edit mapping window 800 includes a mapping source region 808 that displays all possible data sources and a mapping destination region 810 that displays all possible data destinations. The name space information provided by the communications objects 304 and 306 are displayed in their respective regions 808 and 810 by the mapping window object 506. The name space information is preferably displayed in a manner that provides the user with the ability to quickly and easily select a desired source and destination address from the respective name space, allowing the user to add new mappings to, or modify existing mappings of, a selected configured method 200. In the illustrative embodiment, for example, the mapping source region 808 is displayed on the left-hand side of the window 800 while the mapping destination region 810 is displayed on the right-hand side, enabling the user to easily identify source/destination mappings. Other arrangements are considered to be within the scope of the present invention.

For each mapping, the source may be a source address in the software application name space. Preferably, the source name space region 814 displays all the source addresses available in the source application in a user-defined hierarchial manner. Selection of a source address results in the selected variable name appearing in the mapping source name text entry box 820. Preferably, the mapping window object 506 also provides the user with the option of setting the source to a constant value. In the illustrative embodiment shown in FIG. 8, a constant value entry field 812 is provided to enable the user to set the mapping source to a constant value. This may be useful, for example, when testing the communications objects 304 and 306.

For each mapping, the destination may be a destination address in the software application name space. Preferably, the destination name space region 818 displays all the destination addresses available in the destination application in a user-defined hierarchical manner. Selection of a destination address results in the selected variable name appearing in the mapping source name text entry box 822. Preferably, the mapping window object 506 also provides the user with the option of discarding the mapped data unit. In the illustrative embodiment shown in FIG. 8, a discard radio button 816 is provided to enable the user to set the mapping destination to discard the transferred data unit. This may be useful, for example, when testing the communications objects 304 and 306.

Once the source and destination addresses are selected, the user adds, modifies, resets or cancels the mapping using the activity control buttons 806. If selecting, the mapping window object 506 updates the configured method 200 stored in the configuration directory 218 in the configuration repository 116. These mappings are then available to the data server 108 to perform the desired mappings upon the occurrence of events that satisfy the associated trigger criteria.

Figure 9:
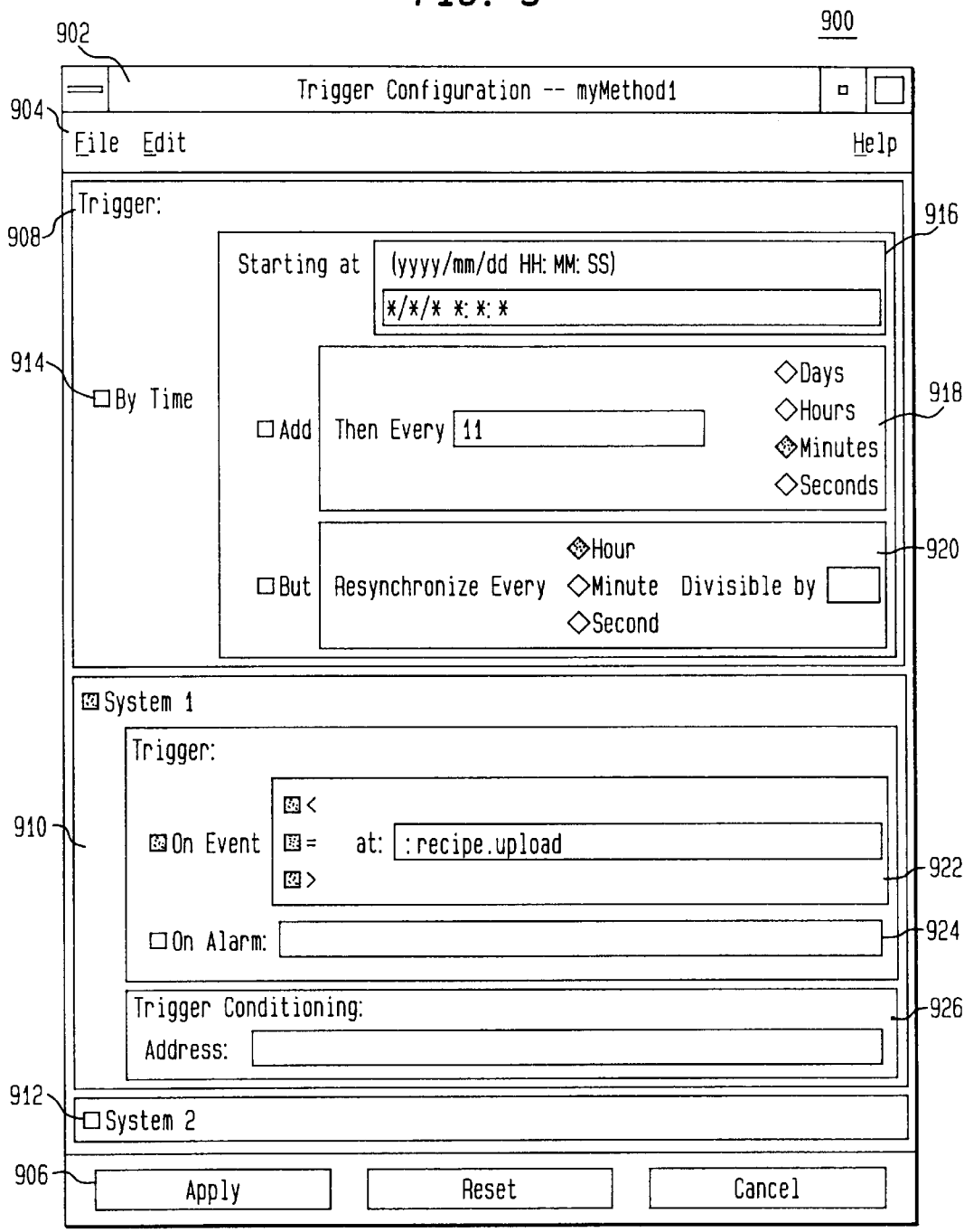
FIG. 9 is an illustration of the trigger window provided by the configuration system illustrated in FIG. 1A.

The core component 302 also includes a trigger window object 508 for displaying an edit trigger window for a selected configured method. FIG. 9 is an illustration of an exemplary embodiment of an edit trigger window 900. The trigger configuration window title bar region 902 displays the name of the configured method currently being edited. In accordance with the present invention, the trigger window object 508 allows the user to specify the circumstances that cause the data units located at the user-selected source addresses to be transferred to the destination address defined in the associated mappings. Preferably, the trigger criteria specified by the user include generic, time-based criteria as well as software application-specific criteria.

In the illustrative embodiment, these three types of trigger criteria are presented in three regions or panels. A generic trigger criterion region 908 containing generic trigger criteria such as time-based trigger criteria, and two software application-specific trigger criterion regions 910 and 912 containing any conceivable trigger criteria that may occur to indicate when the transfer of data units is to occur.

The generic trigger criteria region 908 includes such user-selectable time-based criteria a starting time (916), resynchronization time (918) and a periodic time (920). These fields are activated in the illustrative embodiment by selecting the By Time selection button 914. Other time-based or other generic, non-application-specific trigger criteria are considered to be within the scope of the present invention.

The software application-specific trigger criteria regions 910 and 912 may include any necessary trigger criteria that properly identifies the conditions under which the associated mappings should occur. In the illustrative embodiment, these include specific event triggers (922), alarm triggers (924) and trigger conditions (928) specifying one or more criteria arranged in accordance with user-defined boolean logic. Other types of trigger criteria are considered to be within the scope of the present invention.

Activity control buttons 906 enable the user to apply, reset and cancel the entered information into window 900. If selected, the trigger window object 508 updates the configured method 200 stored in the configuration directory 218 in the configuration repository 116. These triggers and their associated mappings are then available to the data server 108 to perform the desired mappings upon the occurrence of events that satisfy the associated trigger criteria.

A naming alternatives window object 510 and its associated window allows the user to specify alternate names to use when doing branch assignments on the edit mapping window 800. Branch assignments allow the user to define mappings between the children in a source branch and the children in a destination branch in one step, rather than having to define the mappings for each child. During a branch assignment, the configuration tool 114 creates a new mapping from each child in the source branch to each child with the same name in the destination branch. Usually, each child name in the source branch must exactly match a child name in the destination branch. Using naming alternatives, a user can do branch assignments even if the child names in the source branch do not match the child names in the destination branch.

Each naming alternative defines a matching criteria and an alternate name generation methodology. The matching criteria can specify an exact match, a pattern match, or a regular expression match. The alternate name can either be a constant value, the result returned by a data transform procedure, or the source can be marked for discard. During a branch assignment, if the child name in the source branch is not found in the destination branch, the configuration tool 114 checks for matching criteria in the naming alternatives. If the configuration tool 114 finds matching criteria for the child name, it generates a new destination name using the matching criteria's alternate name generation methodology. The configuration tool 114 then uses this new destination name in a second attempt to define the mapping. If this second attempt to define the mapping also fails, the source is not mapped.

Figure 10:
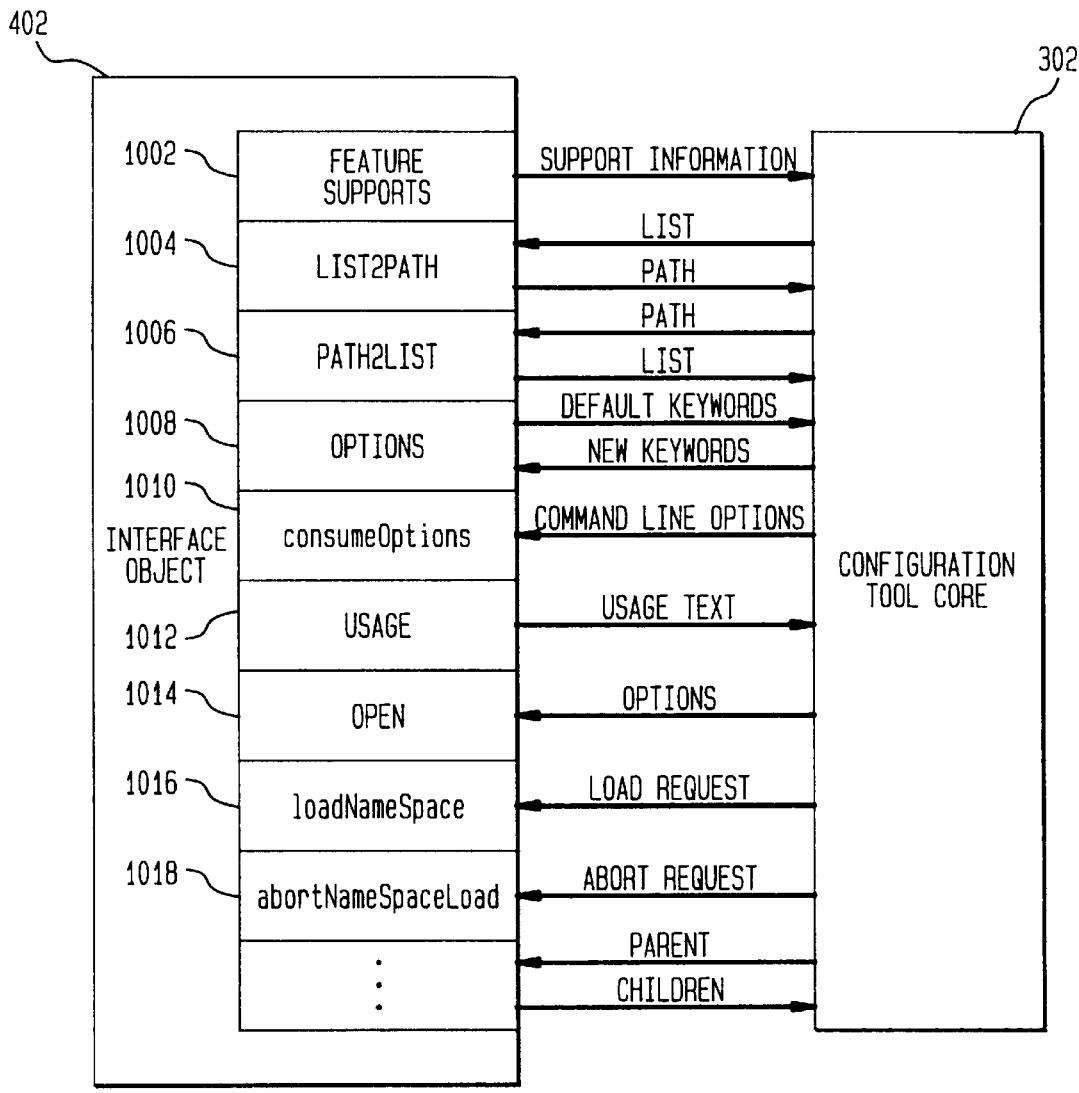
FIG. 10 is an interface block diagram of the interface object in the configuration tool communication object illustrated in FIG. 4.

FIG. 10 is an interface block diagram of the interface object 402 in the communication objects 304, 306 illustrated in FIG. 3. As noted, the interface object 402 provides the core component 302 with the associated software application's name space, and creates and maintains data mappings to and from the associated software application 102 and 104. The relevant methods contained within the interface object 402 are described below.

The interface object 402 includes a feature support method 1002 that indicates whether or not a specified functionality is supported by the associated communication object 304, 306. The configuration tool core component 302 repeatedly invokes method 1002 at system startup to determine what functionality the associated communication object 304, 306 provides and what configuration tool facilities 308 are needed. When the configuration tool 114 invokes the feature support method 1002, it passes this method one parameter: a keyword identifying a unit of functionality that the configuration tool 114 wants to know about.

The feature support method 1002 preferably recognizes keywords that address whether or not the communication object 304, 306 supports the flow of data to/from the associated software application 102, 104 to the data server 108. A non-selection disables the edit method window's respective direction control radio button 718, 720. Additional keywords that indicates whether or not the communication object 302, 304 supports the display and editing of application-specific access and trigger information, whether or not the data server's communication object (discussed below) supports the spooling of data received from the associated software application 102, 104, and other functions are also within the scope of the present invention. All unrecognized keywords cause the feature support method 1002 to return a zero, which indicates that the unrecognized unit of functionality is not supported.

The interface object 402 includes a list2path method 1004 that converts a Tcl list to a path string specification and a path2list method 1006 that converts a path string to a Tcl list. These methods are utilized in the embodiment wherein the application integrator 106 is implemented in the Tcl programming language as noted above. The syntax of the path string specification is appropriate for the associated software application 102, 104. For example, if the associated software application 102, 104 is Hewlett Packard's RTAP product, path specifications would use the same syntax as RTAP's symbolic database addressing.

The configuration tool 114 invokes the list2path method 1004 to convert Tcl lists to ordinary path string specifications. The configuration tool 114 displays the paths to the user as ordinary path strings but performs all computations on paths when they are encoded as Tcl lists. When the configuration tool 114 invokes the list2path method 1004, it passes this method one parameter: the Tcl list to be converted to a path string specification. It expects the list2path method 1004 to return the resulting path string specification. Conversely, the path2list method 1006 converts a path specification into a Tcl list. The configuration tool 114 invokes the path2list method 1006 to convert ordinary path string specifications to paths expressed as Tcl lists. When the configuration tool 114 invokes the path2list method 1006, it passes this method one parameter: the path string to be converted to a Tcl list. It expects the path2list method to return the resulting Tcl list. The list2path method 1004 and the path2list method 1006 must implement exactly the opposite conversions.

The interface object 402 includes methods related to obtaining and setting command-line option keywords, parse command-line options, and return the text needed for a command-line usage message. An options method 1008 queries and sets command-line option keywords. A consume options method 1010 processes command-line arguments. The usage method 1012 returns command-line usage information. These methods are functionally similar to methods having similar names that are included within the data server 108 described in detail below.

The interface object 402 includes an open method 1014 that loads configuration information and prepares the communication object 304, 306 to open a connection to the associated software application 102, 104. The configuration tool 114 invokes the open method 1014 during system startup. When the configuration tool 114 invokes the open method 1014, it may pass this method one or more optional parameters that influence how the connection is opened. These options include an option that sets the configuration directory 218 to the full directory path name to the current object's configuration directory. Another option may specify that the communication object 304, 306 is to print debug messages to a specified location. This can be useful for debugging. Another option may specify that the communication object 304, 306 is to emulate the connection to the software application 102, 104. Such an option may be useful for testing. Another option may specify that the communication object 304, 306 is to print status messages to a specified location. Such an option may also be useful for debugging.

The interface object 402 includes a loadNameSpace method 1016 that loads the associated software application's name space. The loadNameSpace method 1016 starts the transfer of name-space data from the associated software application 102, 104 to the configuration tool 114. As noted, this name-space data appears in the configuration tool's edit mapping window 800.

The interface object 402 also includes an abortNameSpaceLoad method 1018 that aborts the current name-space load that is in progress. The configuration tool 114 invokes the abortNameSpaceLoad method 1018 to abort the transfer of name-space data previously started by the loadNameSpace method 1016 when the user cancels the loading of the name space through an associated window in the graphics console display 112.

Figure 11:
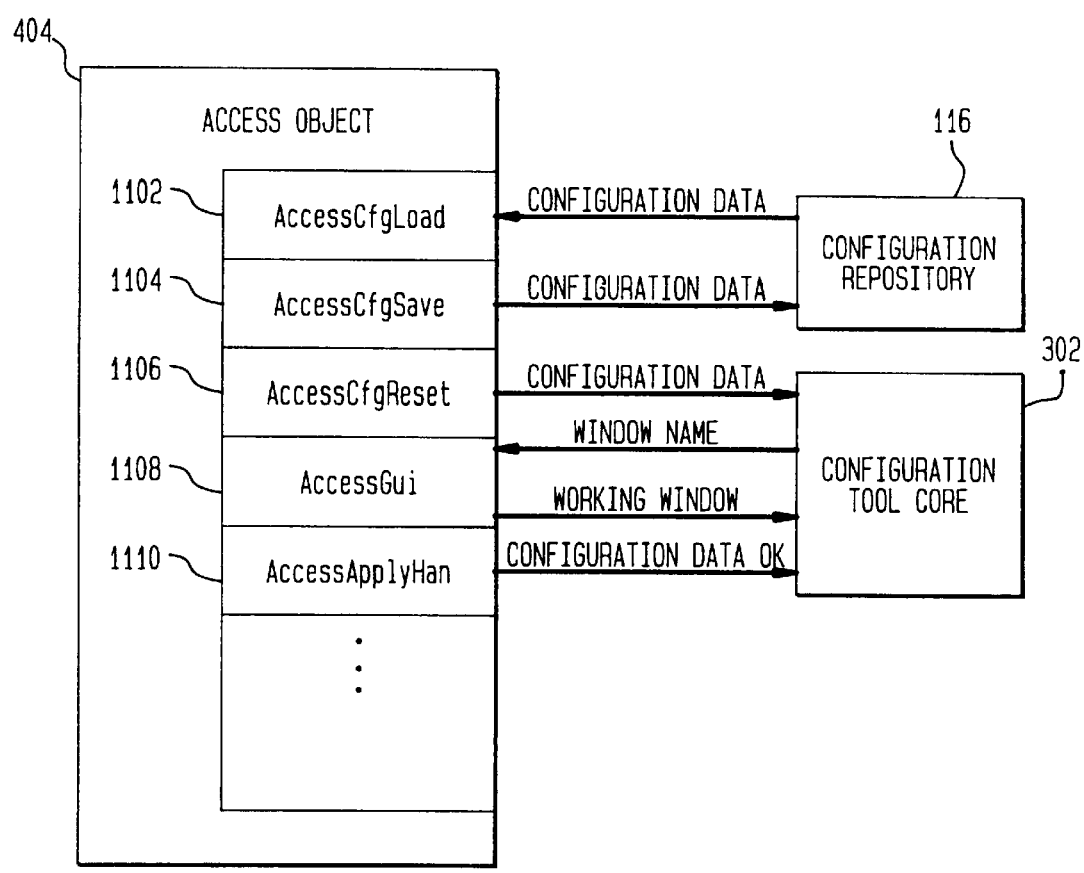
FIG. 11 is an interface block diagram of the access object in the configuration tool communication object illustrated in FIG. 4.

FIG. 11 is an interface block diagram of the access object 404 in the configuration tool communication objects 304, 306 illustrated in FIG. 4. The access object 404 and its associated window are used by the configuration tool 114 to provide the user with the ability to specify software application-specific access information. This includes, for example, connection and startup information that is unique to the associated software application and its system.

Since the access information is not always required, invocation of the access object 404 is optional. If the associated software application 102, 104 does not have any specific access information, the access object 404 may be disabled by setting the appropriate flags in the features supports method 1002 to the appropriate values. Preferably, the access object 404 maintains the system-specific information on a per configuration-object 214 basis.

The access object 404 includes a number of methods, some of which are called by the configuration tool 114 and other of which are called by the communication object 304, 306, to assist in the creation of displays to enable the user to specify the application-specific access information. The user must identify and define the connection and startup information required for the associated software application and, for each item identified, assign a variable name.

The access object 404 includes an access configuration load method 1102 that loads the access configuration stored in the configuration repository 116. Preferably, the access configuration data is stored in a file name specified in a predetermined global Tcl variable. This procedure must be able to read the configuration file written by access configuration save method 1104. In the illustrative embodiment wherein the application integrator 106 is implemented in the Tcl programming language, the access configuration save method 1104 writes the access configuration data to the configuration repository 116 in the form of a Tcl script. Accordingly, the access configuration load method 1102 preferably sources that script.

The access object 404 includes an access configuration save method 1104 that saves access window configuration data to the configuration repository 116. The configuration data is stored in a file name specified by a global Tcl variable. This procedure must write a configuration file that can be read by the access configuration load method 1102. As noted, this method preferably writes the configuration data in the form of a Tcl script.

The access object 404 includes an access configuration reset method 1106 that creates and initializes the global variables needed by the associated application's access object and its associated window. In addition, this method creates and initializes a configuration file revision variable representing the file format used for access configuration data that is stored in the configuration repository 112. This variable will be saved whenever the access object's window configuration is saved and checked whenever the access window's configuration is loaded.

An access graphical user interface (Gui) method 1108 creates, configures and displays an access window on the graphics console 112. An Access Apply Handle method 1110 checks and then saves the current values of the access configuration variables to the configuration repository 116. This method 1110 saves the current values of the access variables to the configuration file using the access configuration save method 1102.

Figure 12:
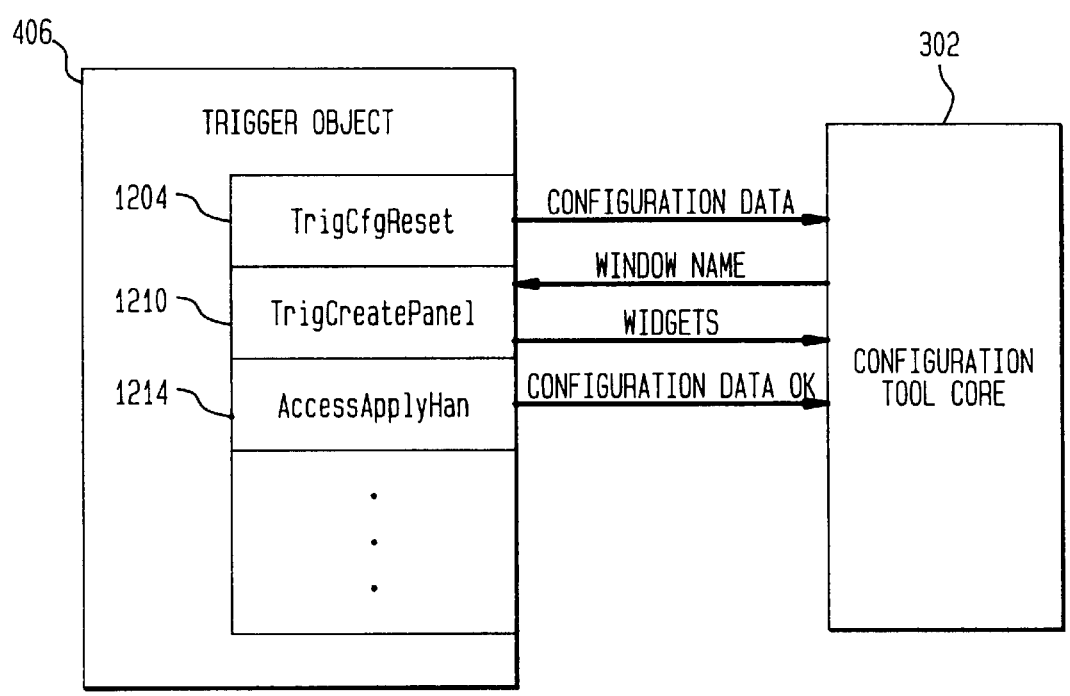
FIG. 12 is an interface block diagram of the trigger object in the configuration tool communication object illustrated in FIG. 4.

FIG. 12 is an interface block diagram of the trigger object 406 in the configuration tool communication objects 304 and 206 illustrated in FIG. 4. The trigger object 406 interoperates with the core component 302 to display the system-specific trigger window 900. The configuration tool 114 uses the trigger window 900 to provide the user with the ability to specify system-specific trigger information. This includes, for example, trigger sources and filters that are unique to the associated software application 102, 104. Since the associated software application 102, 104 may not require specific trigger information, the trigger object 406 optionally displays the application-specific trigger criteria windows 910 and 912. The trigger panel object 406 for the associated communication object 304, 306 may be disabled in a manner similar to the access object noted above. Preferably, the trigger object 406 provides one trigger criterion region 910, 912 for each software application 102, 104, with the trigger configuration data maintained on a per-configured method basis. Other display arrangements are considered to be within the scope of the present invention. The trigger object 406 includes methods that are called by the configuration tool 114 and the communication object 304, 306.

In order to define the trigger criteria required for the associated software applications, the user must classify the application system's orientation. There are two basic orientations: systems that asynchronously send the mapped data in messages and systems that allow the mapped data to be pulled from the application's system.

Systems that asynchronously send the mapped data in messages push the data. The application integrator 106 typically has little or no control over which messages are received, when they are received, and in what order they are received. These systems are message oriented. For such systems, the system-specific trigger conditions usually specify some type of filtering criteria based on the content of the received messages, such as a message name, a message field name, or a message field data value. Although the receipt of the message is the trigger, filtering criteria may chosen to discard the message as if none was received.

Systems that allow the mapped data to be pulled from the target system are database oriented. For such systems, the system-specific trigger conditions usually specify some type of event that causes the application integrator to get the data. The event itself is usually an asynchronous event message generated by the software application, such as a database value-changed event or an invalid-value alarm. Preferably, the data server 108 arranges for the application to generate these asynchronous trigger messages by configuring the application as appropriate.

Once the user assigns a variable name to each of the items identified above, two Tcl methods are available to initialize and print the data. A trigger reset method 1204 creates, then sets the variables in the trigger panels 910, 912 to their default state. The configuration tool 114 calls this method during startup to create and initialize the global variables needed by the software application's trigger panel 910, 912. The configuration tool 114 accesses predetermined global variables to determine the names of the variables associated with the application's trigger panel 910, 912.

A trigger create panel method 1210 creates the software application's if trigger panel 910, 912. These panels are automatically inserted into the trigger window 900 as needed. The layout of the trigger windows are prepared for use with Tk in a manner well known in the art. The panel's elements are created using Tk widgets and provided to the core 302 for display.

An access apply handle method 1214 verifies the values stored in the software application's trigger configuration variables. If any invalid values are found, this procedure should report the error and return. In this case, the displayed trigger configuration is not saved and the trigger window 900 remains mapped. Otherwise, this procedure should return without error, indicating that the target system's portion of the trigger configuration is correct.

III. Data Server

Figure 13:
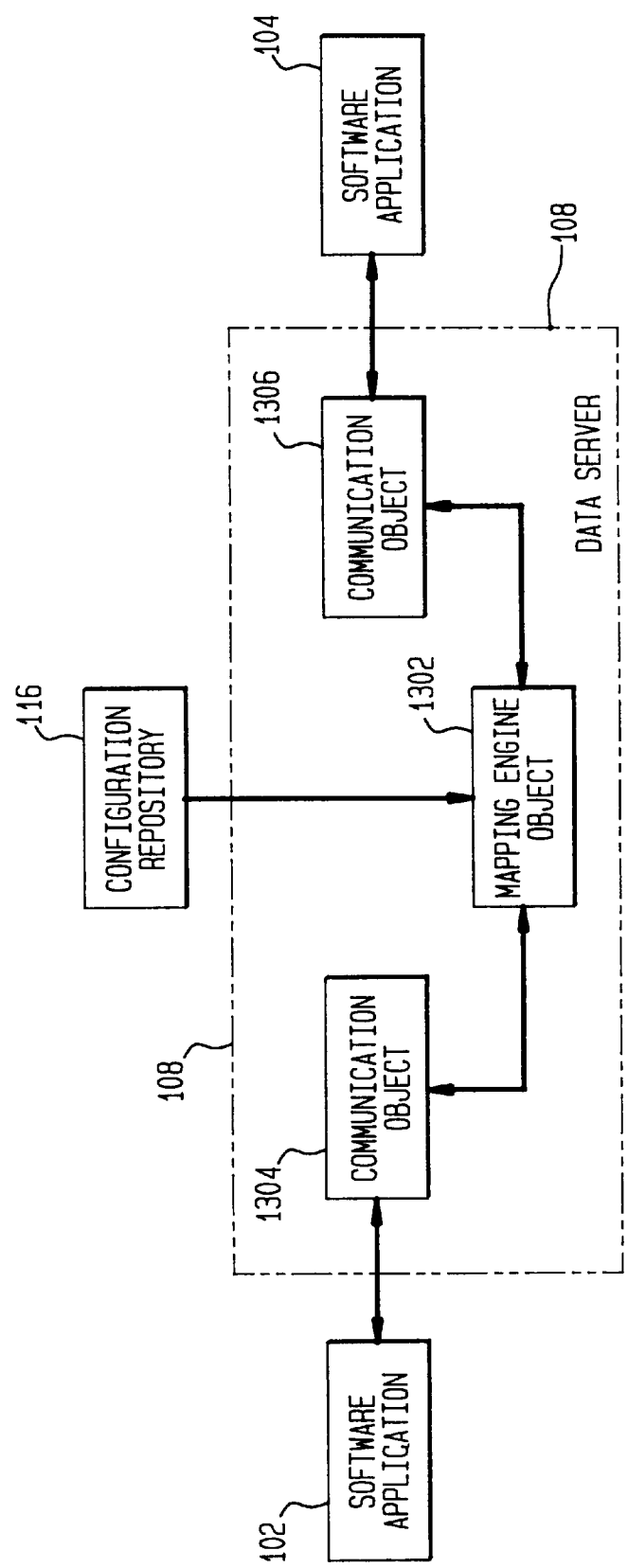
FIG. 13 is a block diagram of the high level architecture of the data sever illustrated in FIG. 1A.

FIG. 13 is a high level architectural block diagram of the data sever 108 illustrated in FIG. 1. The data server 108 includes two distributed communication objects 1304, 1306 that connect the data server 108 to the software applications 102, 104, and a mapping engine component 1302 that performs the data unit mappings in accordance with the present invention.

Each communication object 1304, 1306 controls all communication between their respective software application 102, 104 and the mapping engine 1302. The communication objects 1304, 1306 communicate with their associated software applications 102, 104 through any necessary mechanism and contain all software application dependencies, including the generation of application-specific triggers and application-specific interfacing requirements. In one preferred embodiment, each communication object 1304, 1306 is comprised of both Tcl code and C code, with the C code responsible for direct communication with the application's application program interface (API). In alternative embodiments, the communication objects 1304, 1306 are comprised of solely Tcl code.

Communication objects 1304, 1306 are preferably distributed communication objects, having a portion residing on the computer platform hosting the associated software application 102, 104, and a portion residing on the platform on which other portions of the application integrator 106 reside. In this embodiment, the portions of the communication object 1304, 1306 are connected by a well-known communication channel, such as a UNIX socket. Alternative arrangements are contemplated by the present invention. For example, in an alternative embodiment the communication objects 1304, 1306, mapping engine 1302 and the associated software applications 102, 104, reside on the same computer platform.

The mapping engine object 1302 controls all communication between the communication object 1304 and communication object 1306 in accordance with the present invention. The mapping engine object 1302 accesses the configuration repository 116, responds to triggers, and maps source to destination addresses, while transforming the data units being mapped. The mapping engine object 1302 also manages communication with the trace and error logs as specified by the user.

In accordance with the present invention, the interface between the data server communication objects 1304, 1306 and the mapping engine object 1302 is a standardized interface. Significantly, only an address/value pair is transferred between the communication objects 1304, 1306 to effect the transfer of a data unit. The address portion of the address/value pair is an address selected from the software application's name-space, and the value portion of the address/value pair is encoded in a neutral form. Advantageously, this requires that the communication objects 1304, 1306 only consider the name-space of its associated software application, and with the conversion between the data format of the associated software application and the predetermined neutral format. This neutral format is preferably an ISO 8859-1 character string. However, other formats may be used, such as ASCII. Thus, although the data received from the software applications may be in any arbitrary format, the communication objects converts the (source) address/value pair into the neutral format prior to transferring it to the mapping engine 1302. Likewise, the mapping engine 1302 provides the other communication object with the (destination) address/value in the neutral format for subsequent conversion by the receiving communication object.

The interface between the communication objects 1304, 1306 and the mapping engine 1302 is designed to support transaction-oriented data transfers via any well-known commit and rollback protocol. When mapping attempts fail, the data server 108 rolls back all data transfers done by all previous mappings associated with the configured method 214 and the current trigger event in accordance with user-specified criteria.

In the illustrative embodiment, there are only two kinds of information that are exchanged between the communication objects 304, 306 in the configuration tool and the communication objects 1304, 1306 in the data server 108. These are trigger configuration information and access configuration information. As noted, trigger configuration is the information a user enters into the configuration tool's trigger window 900 describing when a configured method 214 should be executed. Access configuration is user-specified information that the communication objects 1304, 1306 may need to contact the associated software application. For example, access configuration information may include an IP (internet protocol) address, the name of the target application, a user ID and password, a serial port name, speed or parity configuration, and so on.

Both kinds of information are communicated from the configuration tool 114 to the data server 108 through configuration files in the configuration directory 218 of the configuration repository 116. Preferably, in the illustrative embodiment wherein the data server 108 is written in Tcl Programming language, the files are designed to be loaded directly into the data server Tcl environment with the Tcl source command.

Figure 14:
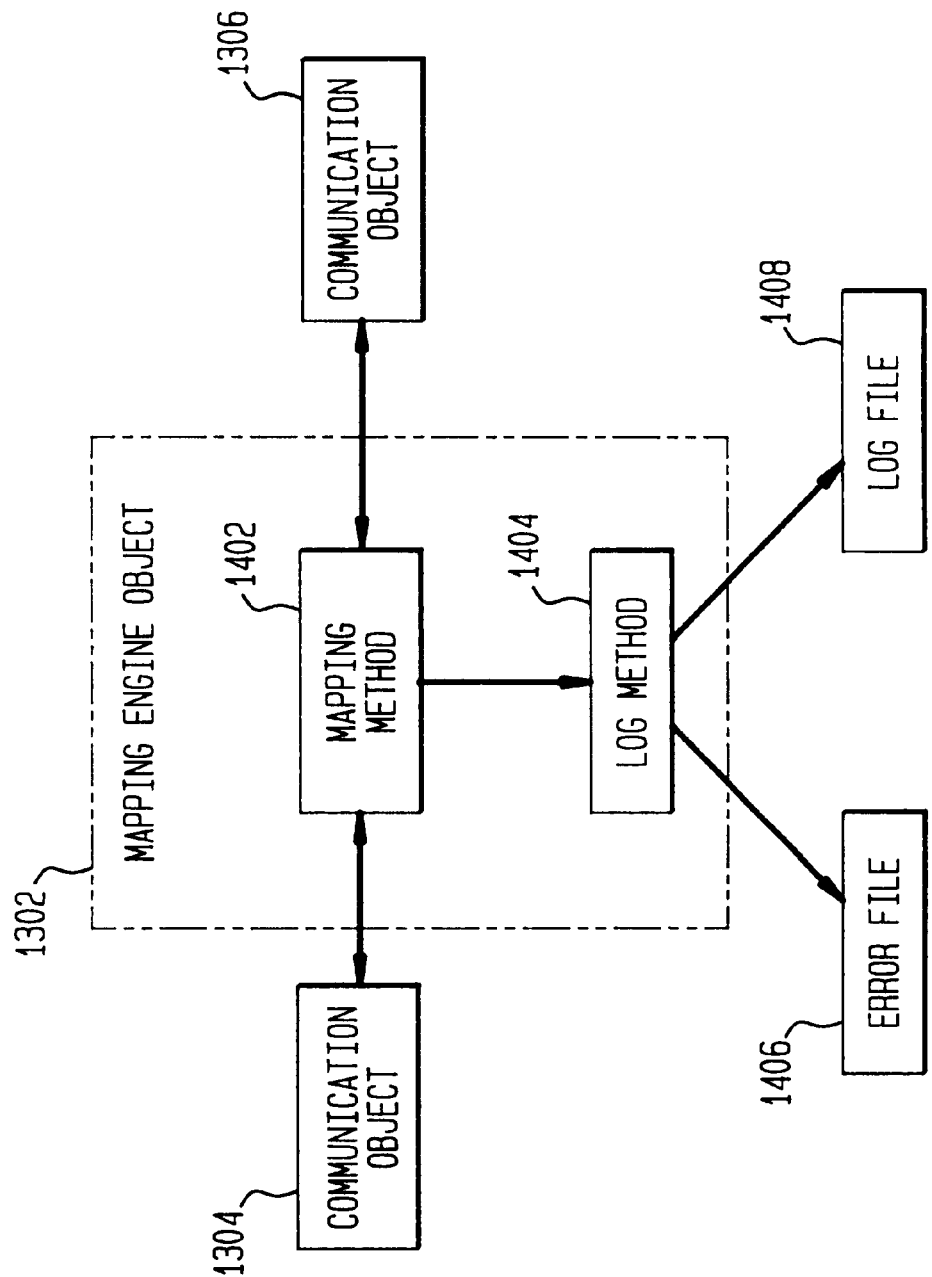
FIG. 14 is a block diagram of the mapping engine component of the data server illustrated in FIG. 1A.

FIG. 14 is a block diagram of the mapping engine object 1302 of the data server 108 illustrated in FIG. 3. The mapping engine object 1302 includes a mapping method 1402 and a log method 1404. The mapping method 1402 controls the communication between the communication objects 1304 and 1306. The mapping method 1402 reads the configuration repository 116, responds to triggers, and maps source to destination addresses, while performing the necessary transformations of the data units being mapped.

The log method 1404 manages communication with the trace and error logs 1406, 1408. Communication objects 1304, 1306 use the log method 1404 to write error, warning, and tracing information to the error and tracing logs 1406, 1408. The mapping engine object 1302 reads the logging configuration in the configuration repository 116, decides where and how big the logs should be, and so forth. In particular, the log method 1404 keeps track of which kinds of messages should be logged and which should not. Methods in communication objects 1304, 1306 invoke the log method 1404 any time they have anything to report or to trace. The log method 1404 will either send the message to the appropriate log or will discard the message depending on how the end user configures the log method 1404. Error and trace logging are considered to be well-known in the art.

Figure 15:
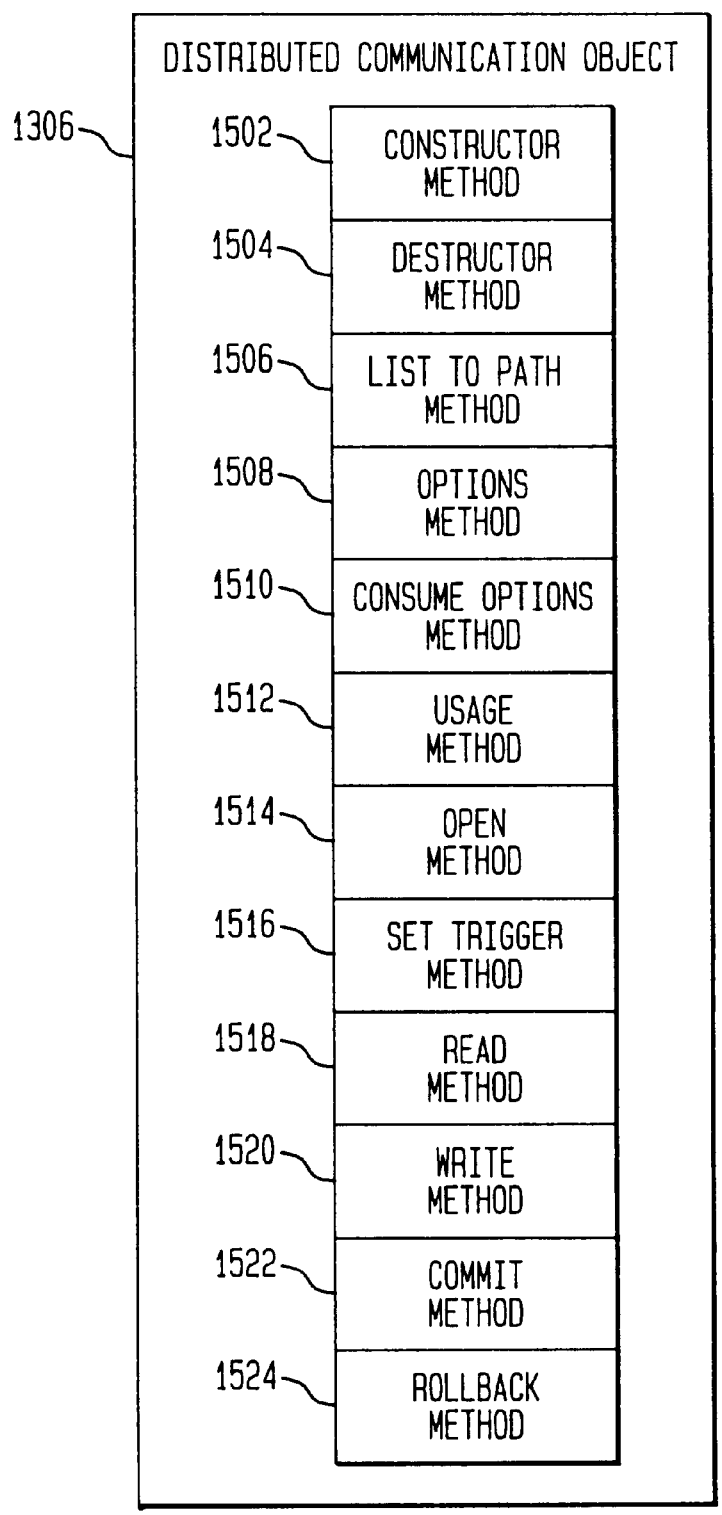
FIG. 15 is a block diagram of the distributed communication objects of the data server illustrated in FIG. 1A.

FIG. 15 is a block diagram of the distributed communication objects 1304, 1306 of the data server illustrated in FIG. 13. The communication objects 1304, 1306 contain a number of methods for communicating with their respective software application 102, 104 and the mapping engine object 1302.

The communication objects 1304, 1306 contain a constructor method 1502 that performs non-trivial initialization of instance variables. Such instance variables may include instance variables that are an array that must be initially populated with constants values.

The communications objects 1304, 1306 include a destructor method 1504 that shuts down communication with the associated software application 102, 104. The destructor method 1504 releases all the resources used by the communication object 1304, 1306. This includes, for example, any other objects the communication object 1304, 1306 created, any communication channels the communication object 1304, 1306 opened, any temporary files, etc.

The communication objects 1304, 1306 also may include a List2path method 1506 for converting a Tcl list to a path string in the illustrative embodiment. It is noted that a similar method must be developed for the configuration tool 114. This is to ensure that the syntax of the path string specification is appropriate for the associated software application 102, 104. For example, in an illustrative application wherein the software application 102 is Hewlett Packard's RTAP (Real-Time Application Plafform) product, path specifications would need to be converted to the same syntax required by RTAP's symbolic database addressing. The data server 108 invokes the list2path method 1406 to convert Tcl lists to ordinary path string specifications. The data server 108 converts the tracing and error logging information to ordinary path strings but performs all computations on paths when they are encoded as Tcl lists.

The communication objects 1304, 1306 may include three methods associated with command lines: an options method 1508 to query and set command-line option keywords; a consume options method 1510 to process command-line arguments; and a usage method 1512 to return command-line usage information.

The options method 1508 obtains or sets the command-line option keywords supported by the communication object 1304, 1306. Note that a similar method must be developed for the configuration tool 114. When starting the data server 108, the user enters command-line options onto the operating system's command line. For example, -file <name>. Command-line option keywords, -file in this example, distinguish one command-line option from another. The data server 108 invokes options up to two times during startup. The first invocation is to get the list of default option keywords supported by the communication object. If any of those keywords are also used by another communication object or by the data server's core component, the method 1408 is invoked a second time to rename those keywords. When the data server 108 invokes options method 1508 the first time, the data server 108 does not pass in any parameters. It expects the options method 1508 to return a Tcl list of default command-line option keywords. When the data server 108 invokes the options method 1508 the second time, it passes it one parameter: a Tcl list with the new (possibly changed) values for the communication object's command-line option keywords. The number of items that the data server 108 includes in this Tcl list will always equal the number of items that were returned by the data server's first invocation of the options method 1508.

The consume options method 1510 parses and consumes the command-line options contained in a specified global variable. Note that a similar method must be developed for the configuration tool 114. The data server 108 invokes this method during startup to provide the communication object 1304, 1306 with an opportunity to parse its command-line options in the data server command line. At startup, the data server 108 invokes the method 1510, passing it one parameter: the name of the global variable containing the program's command-line options as a Tcl list. The method 1510 examines this list and remove any options that apply to the communication object 1304, 1306. All unrecognized options should be left untouched since the data server 108 passes the resulting list to the other communication object 1304, 1306, then consumes all command-line options supported by the mapping engine object 1302. If any command-line options remain after this, the data server 108 reports a usage error and exits. The consume options method 1510 parses for and removes recognized command-line options as well as to examine, but not remove, a command-line option that the data server's mapping engine object 1302 supports and will eventually remove.

The usage method 1512 returns the text for a command-line usage message. The data server 108 invokes this method whenever command-line usage errors are detected. The data server 108 uses the information returned by this method to compose and print a human-readable usage message. Note that a similar method must be developed for the configuration tool 114.

The communication objects 1304, 1306 may also contain an open method 1514 for preparing the communication object 1304, 1306 for use. The open method 1514 loads the configuration file from the configuration directory of the repository 116 and sets the instance variables. Note that a similar method must be developed for the configuration tool 114. If the configuration tool 114 has identified particular access information for the associated software application 102, 104, the open method 1514 must load the access configuration file from the repository 116. The open method 1514 must then do any initialization or communication channel creation associated with the information in the access configuration file. In addition, if the communication object 1304, 1306 supports data spooling, the open method 1514 initializes the spoolers as well.

The communication objects 1304, 1306 may also contain a set trigger method 1516 to set a trigger for an indicated configured method 200. The method 1516 associates a configured method name with a trigger condition. If necessary, this method tells the application system 102, 104 to notify the communication object 1304, 1306 that a trigger condition occurred and it establishes a Tcl event handler to receive the notification. The method 1516 takes a single argument: the name of the configured method that the trigger condition is associated with. The invoker's local variables contain the description of the trigger condition. The set trigger method 1516 extracts the values of these variables, the names and meaning of which is part of the interface between the configuration tool 114 and the data server 108. Whenever a trigger is detected, the mapping engine object 1302 is invoked to execute all the configured methods 200 whose trigger conditions 202 were satisfied.

The communication objects 1304, 1306 may also contain four methods related to transferring data between the communication object 1304, 1306 and the associated software application 102, 104, including reading and writing values from the target application system 102, 104, and commit or rollback write invocations in target application systems that support a commit concept. A read method 1518 reads values from the target system 102, 104. A write method 1520 writes values to the target system 102, 104. A commit method 1522 makes all write invocations since the last commit or rollback permanent. A rollback method 1524 undoes all write invocations since the last commit or rollback.

The read method 1518 reads values from the associated software application 102, 104 and stores them in a source array. This method is passed a list of method names for which to acquire data and the name of the source array in which to store the data.

The mapping method 1402 invokes the read method 1518 when it needs data values in order to execute the list of configured methods 200. The read method 1518 retrieves a list of name-space source addresses that specify which data values are needed. The read method 1518 must then retrieve the needed data values from the associated software application 102, 104.

In database-oriented communication objects 1304, 1306, the read method 1518 must query the database for data values at the indicated source addresses. In message-oriented communication objects 1304, 1306, the read method 1518 must find source data values for all the indicated source addresses in the most recent message received from the associated software application 102, 104.

The write method 1520 sends data to the software application 102, 104. In communication objects that do not support commit functions, the values are written to the application 102, 104 immediately. In objects with a commit method 1522, the values are only written to the application 102, 104 after the commit method 1522 is invoked or the values are undone when the rollback method 1524 is invoked.

This method is invoked once for every configured method 200 that executes. When values are written to a table, the write method 1520 interprets all writes to the same table as being to the same row of that table. The next write invocation then starts another row. In message-oriented communication objects, when values are written to a message, the write method 1520 interprets all writes to the same message as being to the same instance of that message. The next write invocation can start another message. For messages that contain tables, the next write invocation generally starts a new row in the table and the message is not sent to the target application 102, 104 until commit is invoked.

The occurrence of an error within the write method can be handled by logging the error and writing the other values in the list to the target application 102, 104, abandoning the method by logging the error and returning, without writing anything to the application system, or abandoning all methods by logging the error and raising a Tcl error condition with an informative error message. The mapping engine log method 1404 will log the error, abandon work on all other configured methods 200, and invoke rollback for every object that was written to.

The commit method 1522 makes the effects of all write invocations since the last commit or rollback permanent in the target application. If the mapping method 1402 has already invoked commit in several communication objects 214 and then a communication object 214 signals an error, very little error recovery can occur. As a result, the mapping method 1402 has no choice but to log an error and continue committing, because objects that have been committed can not be rolled back. The rollback method 1524 undoes the effects of all the write invocations since the last commit or rollback invocation.

In a preferred embodiment of the present invention, the data server communication objects 1304, 1306 are preferably implemented in Tcl. This is because it is usually faster to write Tcl code than to write C code because Tcl enables the developer to avoid C's compile-link-execute cycle. However, the resultant Tcl code generally runs one hundred to one thousand times slower than a corresponding C function. Thus, if communication objects are anticipated to perform a significant amount of low-level data manipulation, it may be preferably to develop the more processing-intensive portions of the communications object in C rather than in Tcl. As one skilled in the relevant art would find apparent, in those circumstances where the processing cost is presently unknown, the communication object may be initially written in Tcl. Those portions that are most expensive can be later translated into C. The Tcl communication object 1304, 1306 for the data server 108 contains methods associated with a user-defined communication class. However, it is noted that if the interface to the software application 102, 104 is very simple, for example, an ASCII protocol on a tty port or a socket, C-code may not be required in communication objects 1304, 1306. The standard Tcl file manipulation commands, or one of the more popular sockets extension packages like TclX (Tcl extension) or DP (distributed processing), may be all that is necessary to send messages to and receive messages from the software application 102, 104.

It is noted that it is preferable not to define the interface between the communication object 1304, 1305 and the application 102, 104 as a one-to-one correspondence between Tcl commands and a complex suite of API functions or communication primitives. The Tcl interface provides an opportunity to simplify the mechanisms for communicating with the target application system, thereby making the Tcl portion of the communication object simpler. For example, if the mechanics of sending a message to and receiving a reply from the target application system require the invocation of 5 or 10 C functions for one transaction, the complexity of all those commands may be encapsulated in one or two commands. However, the desire to simplify the interface must be balanced against the cost of simplification. As noted, most users write Tcl code faster than an equivalent amount of C code. Therefore, it would be more cost effective to do complex encapsulation in Tcl than in C. However, if simplifying the interface results in a large body of C code, it may be preferable to expose a slightly more complex interface in Tcl commands and build the final simplifying layer on top of those commands with Tcl code. The development of C code to extend a Tcl interpreter is considered to be well known to those skilled in the pertinent art and is described in "Tcl and the Tk Toolkit" by John K. Ousterhout, Addison-Wesley Publishing Company, Reading, Mass., 1994.

Another factor is whether the interface to the software application is to be message-oriented or database-oriented. In message-oriented systems, the communication object 1304, 1306 communicates with its system by sending it messages and receiving messages from it. Paths in the object's logical name space identify fields in those messages. In database-oriented systems, the communication object 1304, 1306 communicates with its system 102, 104 as if it was a database. Addresses in the object's logical name space identify values in the database.

It is preferable to interpret the software application 102, 104 as a database-oriented system since creating interfaces for database-oriented systems are generally easier than for message-oriented systems. The orientation of the software application to a large extent determines your interface. Message-oriented systems tend to be more complex than database-oriented systems because messages and replies generally consist of a great many values sent and received simultaneously. These values must all be supplied at once, must be formed into a message using the right formats, and must be in the right order. Database-oriented systems are much more of a random-access mechanism, each data unit can be sent as it comes without coordinating it into a larger message.

Yet another factor to weigh is the requirement for the data server 108 to respond promptly to external stimuli. The present invention exchanges high-level information between systems, so sub-millisecond response times are generally not required. However, an application may be waiting for information to be exchanged, so subsecond response is often desirable. To respond promptly to external stimuli, the data server 108 should not stop and wait a long time for a communication object that is waiting for a response from its system. Ideally, every operation that may take a long time to complete should be carried out asynchronously, and some kind of event handler should be invoked when the operation is complete. This way, the data server 108 can continue processing other events while the communication object completes the operation. This tends to be easier to do in a message-oriented communication object because each message can be considered an independent transaction.

In practice, however, the asynchronous approach is difficult to implement for a database-oriented communication object and becomes more difficult if the target system's API prohibits it. If the software application provides subsecond response, the delays and any potential throughput degradation may be acceptable. If the software application provides multisecond response times, it is likely that an asynchronous design must be used. If the API prohibits a straightforward asynchronous design, such behavior must be emulated by starting a slave process that communicates to the software application, potentially being delayed for a long time, while the data server 108 continues processing other events.

The communication objects 1304, 1306 preferably also contain a spooling method 1526, particularly when the communication objects 1304, 1306 and the software application system 102, 104 are separated by a less-than-reliable communication link, or if the software application system 102, 104 is less than reliable. The spooling method 1526 buffers data unit values written to the communication object 1304, 1306 while the communication path or application is unavailable. The spooling method 1526 may implement any well known spooling functions. For example, the spooling method 1526 may implement a standard spool and loads a standard spool configuration file. The spooling method may be a first-in-first-out (FIFO) spooler, with character-string "messages" appended to the spooler for later retrieval. Alternatively, the spooling method 1526 may implement a random-access spooler. In such a spooler, an "ID tag" must be specified for each message that is to be spooled. The messages can then be retrieved and deleted by specifying the tag.

Figure 16A:
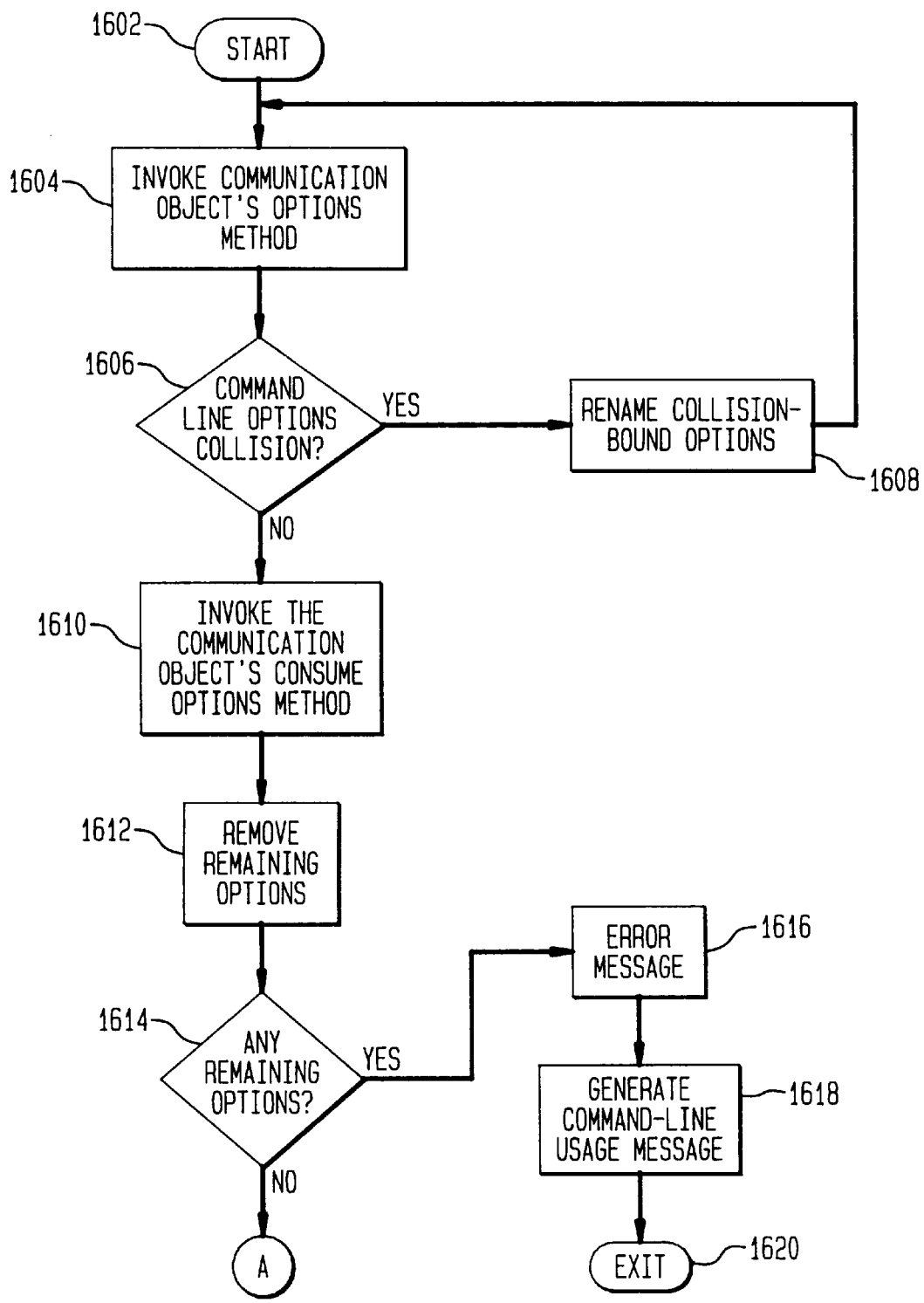
Figure 16B:
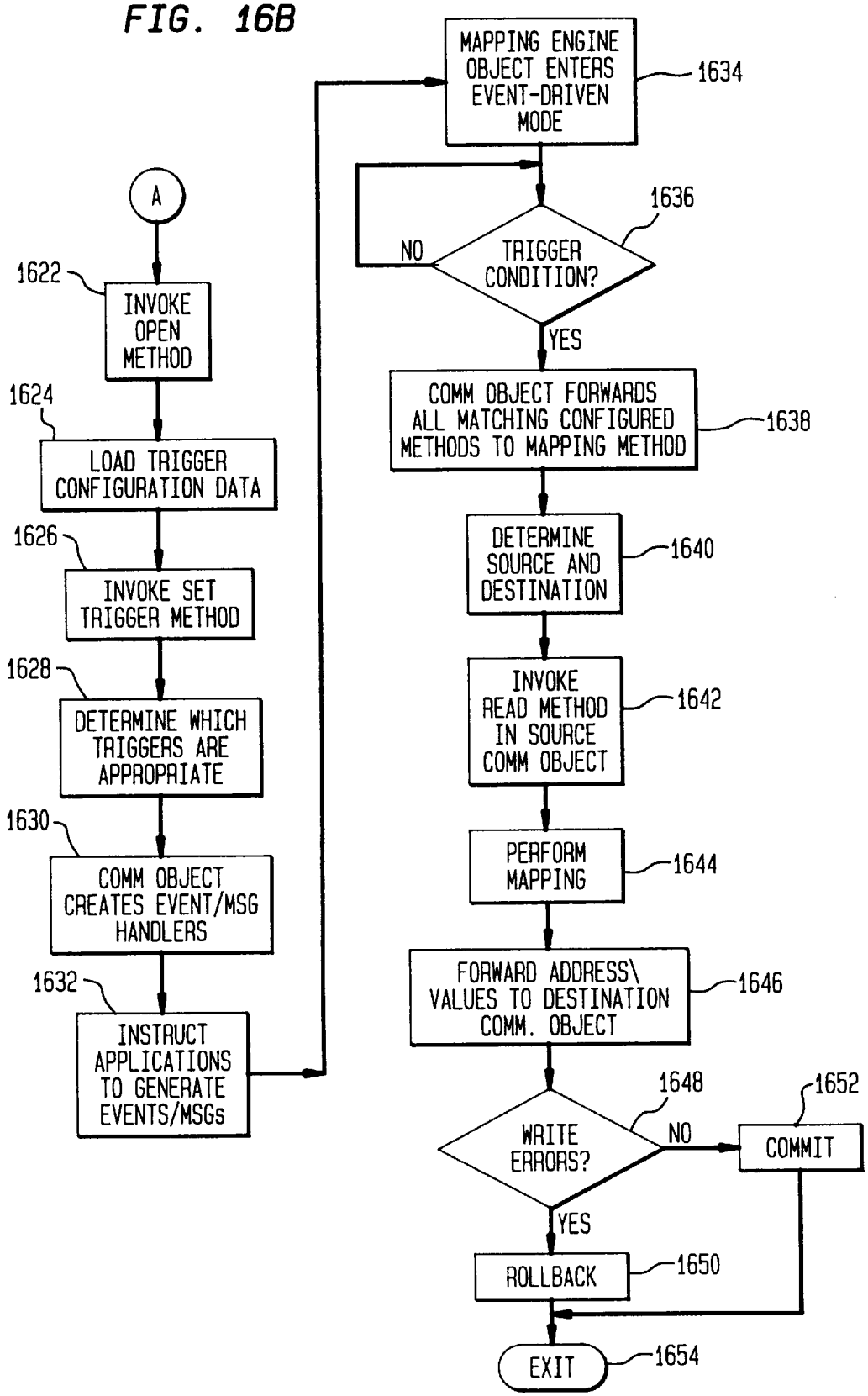

A flowchart illustrating the control flow of the data server 108 is shown in FIG. 16. At start block, 1602 environment and global variables are initialized and the mapping engine object 1302 and both communication objects 1304, 1306 are invoked. This invokes the constructor method 1502 in each communication object 1304, 1306.

At block 1604, the mapping engine object 1302 invokes each communication object's options method 1508 to check for a command-line option that is used by two different communication objects 1304, 1306, presumably to mean two different things. This condition is referred to as a command-line option collision.

If any collisions are detected at decision block 1606, the mapping engine object 1302 renames the collision bound options at block 1608 and invokes the options method 1508 again in both communication objects 1304, 1306, instructing the communication objects 1304, 1306 to use the renamed options. The mapping engine object 1302 then invokes the consume options method 1510 in each communication object 1304, 1306 at block 1610. Here, the mapping engine object 1302 instructs each communication object 1302, 1304 to remove any command-line options it recognizes from the command line and to store them. Any remaining options are removed by the mapping engine object 1302 at block 1612. Any options that were not removed by mapping engine object 1302 at block 1612 as determined at block 1614, results in an error message at block 1616.

If any command-line processing error occurred, the mapping engine object 1302 invokes the usage method 1512 in each of the communication objects 1304, 1306 and formats a human-readable command-line usage message at block 1618. The usage message is printed for the user after a description of the command-line error. Processing then exits at block 1620.

If no command-line processing error occurred at block 1614, the mapping engine object 1302 invokes the open method 1514 in each of the communication objects 1304, 1306 at block 1622. The open method 1514 first loads the communication, spooling, or other configuration files it needs from the configuration directory 218 in the configuration repository 116. The open method 1514 then uses that information and any command-line options that its consume options method 1510 found, to initialize the communication object 1304, 1306 and prepare it for operation. If the communication object 1304, 1306 needs any "worker" objects such as spoolers, the open method 1514 creates and initializes them.

At block 1624 the mapping engine object 1302 then loads each trigger file in the configuration directory 218 of the configuration repository 116. At block 1626, the mapping engine object 1302 invokes set trigger method 1516 in each communication object 1304, 1306 for each trigger. At block 1628, each set trigger method 1516 examines the information loaded from the trigger file and determines whether the information describes a trigger that the communication object 1304, 1306 is responsible for detecting. If so, the communication object 1304, 1306 creates any event or message handlers at block 1630 that are required to detect the trigger, and if necessary, communicates to its associated software application 102, 104 the need to generate those events or messages. The communication object 1304, 1306 also creates any cross-reference information that is required to associate a configured method name with the occurrence of a trigger condition.

After all the triggers have been set at blocks 1628–1632, the mapping engine object 302 goes into an event-driven mode of operation at block 1634. When a communication object's event handler activates and the communication object 1304, 1306 detects that a trigger condition 202 has been satisfied at block 1636, it gives the mapping method 1402 the names of all the configured methods 214 that satisfied the trigger condition 202 at block 1638.

At block 1640 the mapping method 1402 determines which communication object 1304, 1306 is the source and which is the destination for each configured method 214. At block 1642 the mapping method 1402 then invokes the read method 1518 in the source communication object 1304, 1306, which acquires an array containing the source values for the configured methods 214. The mapping method 4702 then maps the source values to the destination paths at block 1644 and passes the result to the write method 1520 in the destination communication object 1304, 1306 at block 1646.

If an error occurred during any write operation and if error handling is configured to abort all configured methods 200 when that error occurs, block 1648, the mapping method 1402 invokes the rollback method 1524 in each communication object 1304, 1306 that was written to with the write method 1520 at block 1650. Otherwise, when all data for all the configured methods has been written to the destination communication objects 1304, 1306, the mapping object invokes, at block 1652, a commit in the communication object 1304, 1306 that was written to with the write method 1520.

FIG. 17 is a flow chart of the operation of the application integrator 106. After start block 1702 the user creates one or more configured methods, each containing one or more mappings and specified trigger criteria at block 1704. This information is saved into one or more configuration files in the configuration repository 116. The user then starts the data server 108 at block 1706. The data server 108 reads the above configuration files, and requests that the appropriate communication object 1304, 1306 detect the occurrence of the specified trigger criteria, and then enters an event-driven mode, waiting for the configured method's trigger criteria to be satisfied.

When one of the data server's communication objects 1304, 1306 detects that a method's trigger criteria has been satisfied at block 1708, it informs the data server mapping engine object 1302 that the associated configured method 200 has been triggered. Alternately, the data server mapping engine object 1302 detects that a configured method's time-based trigger criteria has been satisfied.

Upon the occurrence of the trigger condition, at block 1710, the data server mapping engine object 1302 requests, from the source communication object, the current data values of the configured method's specified source addresses. The communication object obtains these values from the software application, translates the format of all retrieved data values to a neutral format, and then passes the result to the mapping engine object 1302 as address-value pairs (one such pair for each of the configured method's mappings) at block 1712.

At block 1714 the data server mapping engine object 1302 looks up the destination address for each source address to compose a new list of address-value pairs, with the address now being the destination address and the value still expressed in the same neutral format. The data server mapping engine object 1302 sends the new list of address-value pairs to the destination communication object at block 1716.

The destination communication object converts the values to the format expected by the destination software application, and then writes the result to the specified destination addresses in the destination software application at block 1718. The process then completes at block 1720.

It should be noted that the application integrator of the present invention encompasses other features. For example, the configuration system may provide other functions, including providing the user with the ability to interactively debug and test configured methods, control spooling, addressing, and other characteristics of the software applications. In addition, the user may interact with the configuration system in any number of ways. In addition to using the above noted graphical user interface, the user can load configuration tables created by text editors and spread sheets.

Furthermore, the user may configure the data server to separate a single incoming business system message into multiple logical messages for distribution throughout a application database as well as merge multiple logical messages into a single outgoing message.

While various embodiments of the present invention have been described above, it should be understood that they have been presented by way of example only, and not limitation. Thus, the breadth and scope of the present invention are not limited by any of the above-described exemplary embodiments, but are defined only in accordance with the following claims and their equivalents.

What is claimed is:

1. A system for integrating software applications in an enterprise system, the software applications having incompatible programming interfaces, the system comprising:

a configuration system constructed and arranged to retrieve a name space for a source software application in the enterprise system, said source software application having a programming interface, and a name space for a destination software application in the enterprise system that has a second programming interface that is incompatible with said first programming interface, wherein said configuration system displays said name spaces on a display device to enable a user to define data unit mappings by associating graphically data units of the source software application with data units of the destination software application and to specify conditions under which said specified data units are transferred from source application addresses to user-associated destination application addresses, wherein said associations of said data units are stored in a configuration repository; and a data server configured to access said configuration repository to transfer automatically said data units between said source addresses and said associated destination addresses in accordance with said specified conditions.

2. The application integrator of claim 1, wherein said data unit mappings define a programmed interface between the source software application and the destination software application.

3. The application integrator of claim 1, wherein said configuration system comprises:

a configuration tool for providing the user access to the name-space of the source software application comprising said data units stored in said source addresses and a name-space of the destination software application comprising said data units stored in said destination addresses.

4. The application integrator of claim 3, wherein said configuration system further comprises:

a configuration repository for storing one or more configured methods each said one or more configured methods comprising one or more of said data unit mappings and trigger criteria defining conditions under which one or more of said data units are transferred from the source to destination application program in accordance with said one or more data unit mappings.

5. The application integrator of claim 4, wherein said source software application program is a production control software program and said destination software application program is a business enterprise system application program in the enterprise system.

6. The application integrator of claim 4, wherein said configuration tool comprises:

a second source communication object configured to obtain said name-space of the source software application; and a second destination communication object configured to obtain said name-space of the destination software application.

7. The application integrator of claim 4, wherein said trigger criteria comprises system-specific trigger criteria.

8. The application integrator of claim 6, wherein said first and second communication objects specify system-specific access parameters required to communicate with the associated software application.

9. An application integrator for integrating a source software application and a destination software application comprising:

a configuration system for generating one or more data unit mappings, each said mapping representing an association between a source address of a data unit utilized by the source software application and a destination address of a data unit utilized by the destination software application, wherein the configuration system retrieves a name space for the source software application, and a name space for the destination software application, wherein said configuration system displays said name spaces on a display device to enable a user to define data unit mappings by graphically associating data units of the source software application with data units of the destination software application and to specify conditions under which said specified data units are transferred from source application addresses to user-associated destination application addresses; and a data server for automatically transferring said data units from the source software application to the destination software application in accordance with said specified conditions.

10. The application integrator of claim 9, wherein said configuration system comprises:

a core component for graphically representing said source and destination name-spaces and said data unit associations on the display device.

11. The application integrator of claim 1, wherein said data server comprises:

a source communication object configured to interface with the source software application;

a destination communication object configured to interface with the destination software application; and a mapping engine, interposed between said source and destination communication objects, for automatically transferring said associated data units from the source communication object to the destination communication object in accordance with said data unit mappings.

12. The application integrator of claim 11, wherein said mapping engine implements transaction-oriented techniques to transfer said associated data units from the source software application to the destination software application.

13. The application integrator of claim 11, wherein said source and destination communication objects, are distributed communication objects.

14. The application integrator of claim 11, wherein said mapping engine transfers the data units from a source to destination address by transferring a single address/value pair from the source communication object to the destination communication object, said mapping engine transforming said transferred data units in accordance with the destination application.

15. The application integrator of claim 11, wherein said mapping engine transfers an address/value pair between said source and destination communication objects.

16. The application integrator of claim 15, wherein said address/value pair is encoded in a neutral format, and wherein said source and destination communication objects convert the data units between the data format of the associated software application and the said neutral format.

17. A method for integrating software applications in an enterprise system, comprising the steps of:

(a) retrieving a name space for a source software application in the enterprise system, said source software application having a programming interface;

(b) retrieving a name space for a destination software application in the enterprise system that has a second programming interface that is incompatible with said first programming interface;

(c) displaying on a display device said name spaces;

(d) receiving data unit mappings in response to the user graphically associating data units of the source software application with data units of the destination software application on the display device;

(e) receiving user display inputs that specify trigger criteria the occurrence of which is to cause said specified data units to be transferred from said source application addresses to said destination application addresses; and (f) generating a configured method containing said user-specified data unit mappings; and (g) transferring said data units of said configured method from the source software application to the destination software application in accordance with said data unit mappings upon the occurrence of said user-specified trigger criteria.

18. The method of claim 17, wherein said step (g) comprises the steps of:

(1) saving said configured method in a configuration repository;

(2) reading said configuration method by a data server coupled to said configuration repository; and (3) requesting, by the data server, an appropriate communication object to monitor for an occurrence of said trigger criteria.

19. The method of claim 18, wherein said step (g) further comprises the steps of:

(4) detecting an occurrence of said trigger criteria by said communication object;

(5) retrieving from the source communication object current data values of said configured method's specified source addresses;

(6) passing said source address and said data unit in a neutral format to said mapping engine as an address-value pair;

(7) retrieving said associated destination address for said data unit;

(8) creating a new list of address-value pairs, with said address being said destination address and the value still expressed in the same neutral format;

(9) sending the new list of address-value pairs to the destination communication object;

(10) converting said values to a format appropriate for the destination software application; and

(11) writing the result to the specified destination addresses in the destination software application.

20. The method of claim 19, wherein said step (b) further comprises the step of:

(12) before said step (6), translating a format of said retrieved data values to a predetermined neutral format.

21. A system for enabling a user to generate a user-defined programming interface for integrating software applications in an enterprise system, the software applications having incompatible programming interfaces, the system constructed and arranged to retrieve a name space for a source software application in the enterprise system, said source software application having a programming interface, and a name space for a destination software application in the enterprise system that has a second programming interface that is incompatible with said first programming interface, wherein said name spaces are displayed on a display device to enable a user to associate graphically data units of the source software application with data units of the destination software application and to specify conditions under which said specified data units are transferred from source application addresses to user-associated destination application addresses, wherein said associations of said data units are stored in a configuration repository.

22. A system for enabling a user to generate a user-defined programming interface for integrating software applications in an enterprise system, the software applications having incompatible programming interfaces, the system comprising:

a processor;

a controller to control said processor, said controller constructed and arranged to retrieve a name space for a source software application in the enterprise system, said source software application having a programming interface, and a name space for a destination software application in the enterprise system that has a second programming interface that is incompatible with said first programming interface, wherein said name spaces are displayed on a display device to enable a user to associate graphically data units of the source software application with data units of the destination software application and to specify conditions under which said specified data units are transferred from source application addresses to user-associated destination application addresses, wherein said associations of said data units are stored in a configuration repository.

23. A computer program product comprising a computer readable medium having computer program logic recorded thereon for enabling a processor in a computer system to system to generate a user-defined programming interface for integrating software applications in an enterprise system, the software applications having incompatible programming interfaces, the computer program logic retrieving a name space for a source software application in the enterprise system, said source software application having a programming interface, and a name space for a destination software application in the enterprise system that has a second programming interface that is incompatible with said first programming interface, wherein said name spaces are displayed on a display device to enable a user to associate graphically data units of the source software application with data units of the destination software application and to specify conditions under which said specified data units are transferred from source application addresses to user-associated destination application addresses, wherein said associations of said data units are stored in a configuration repository.

* * * * *